MECHANISM FOR PRINTING THE DECIMAL MARK IN A FOUR SPECIES COMPUTING MACHINE

Filed Aug. 13, 1956 16 Sheets-Sheet 1

Inventors:
Werner Heinze,
Werner Jülich,
by Singer, Stern & Carlberg,
Attorneys.

Inventors:
Werner Heinze,
Werner Jülich,
by Singer, Stern & Carlberg,
Attorneys.

Inventors:
Werner Heinze,
Werner Jülich,
by Singer, Stern & Carlberg,
Attorneys.

Feb. 26, 1963 W. HEINZE ET AL 3,079,073

MECHANISM FOR PRINTING THE DECIMAL MARK IN A FOUR SPECIES COMPUTING MACHINE

Filed Aug. 13, 1956 16 Sheets-Sheet 4

Inventors:
Werner Heinze,
Werner Jüllich,
by Singer, Stern & Carlberg
Attorneys.

Feb. 26, 1963 W. HEINZE ET AL 3,079,073

MECHANISM FOR PRINTING THE DECIMAL MARK IN A FOUR SPECIES COMPUTING MACHINE

Filed Aug. 13, 1956 16 Sheets-Sheet 5

Inventors:
Werner Heinze,
Werner Jülich,
by Singer, Stern & Carlberg,
Attorneys.

Feb. 26, 1963 W. HEINZE ET AL 3,079,073

MECHANISM FOR PRINTING THE DECIMAL MARK IN A FOUR SPECIES COMPUTING MACHINE

Filed Aug. 13, 1956 16 Sheets-Sheet 6

Inventors:
Werner Heinze
Werner Jülich
by Singer, Stern & Carlberg
Attorneys.

Feb. 26, 1963 W. HEINZE ET AL 3,079,073

MECHANISM FOR PRINTING THE DECIMAL MARK IN A FOUR SPECIES COMPUTING MACHINE

Filed Aug. 13, 1956 16 Sheets-Sheet 7

Inventors:
Werner Heinze,
Werner Jülich,
by Singer, Stern & Carlberg,
Attorneys.

Inventors:
Werner Heinze,
Werner Jüllich,
by Singer, Stern & Carlberg,
Attorneys.

Inventors:
Werner Heinze
Werner Jülich
by Singer, Stern & Carlberg
Attorneys.

Inventors:
Werner Heinze,
Werner Jüllich,
by Singer, Stern & Carlberg
Attorneys.

Feb. 26, 1963

W. HEINZE ET AL 3,079,073

MECHANISM FOR PRINTING THE DECIMAL MARK IN A FOUR SPECIES COMPUTING MACHINE

Filed Aug. 13, 1956

16 Sheets-Sheet 11

Inventors:
Werner Heinze,
Werner Jülich,
by Singer, Stern & Carlberg,
Attorneys.

Inventors:
Werner Heinze
Werner Jüdsch
by Singer, Stern & Carlberg
Attorneys.

Feb. 26, 1963 W. HEINZE ET AL 3,079,073

MECHANISM FOR PRINTING THE DECIMAL MARK IN A FOUR SPECIES COMPUTING MACHINE

Filed Aug. 13, 1956 16 Sheets-Sheet 13

Inventors:
Werner Heinze,
Werner Jülich
by Singer, Stern & Carlberg
Attorneys

Inventors:
Werner Heinze
Werner Jülich
by Singer, Stern & Carlberg
Attorneys.

Inventors:
Werner Heinze
Werner Jüllich
by Singer, Stern & Carlberg
Attorneys.

Inventors:
Werner Heinze,
Werner Jüllich
by Singer, Stern & Carlberg
Attorneys.

United States Patent Office 3,079,073

Patented Feb. 26, 1963

3,079,073

MECHANISM FOR PRINTING THE DECIMAL MARK IN A FOUR SPECIES COMPUTING MACHINE

Werner Heinze, Schwerzenbach, and Werner Julich, Wallisellen, Switzerland, assignors to Precisa A.G. Rechenmaschinenfabrik, Zurich, Switzerland, a firm Filed Aug. 13, 1956, Ser. No. 603,723
Claims priority, application Germany Aug. 16, 1955
3 Claims. (Cl. 235—60.15)

Figure 1:
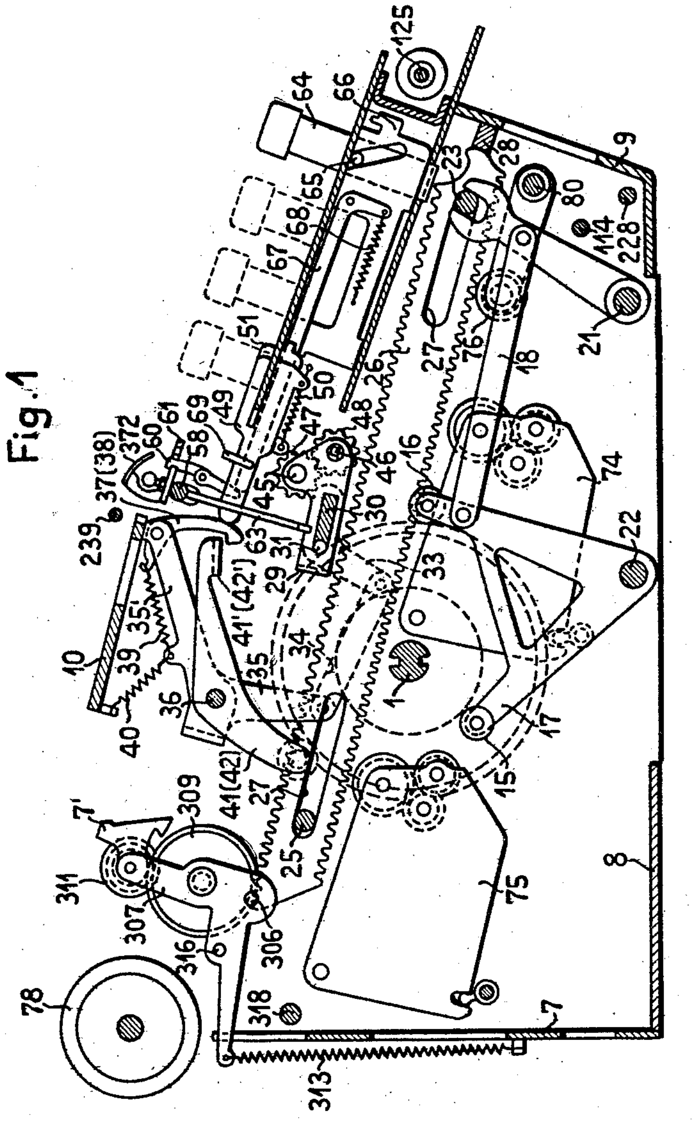

The present invention relates to a four-species computing machine having a set of ten keys, one or a plurality of accumulators, and a printing mechanism for printing the decimal mark at a variable point.

It is the object of the present invention to render the decimal mark (referred to hereinafter as the "comma") insertable by a comma key visible in the window provided in the housing of the machine and to print such comma simultaneously with the numerical items set up, and it is an additional object of the invention to fix the decimal mark by a special selectively operable key for subsequent repeated similar decimal positions at the same time predetermining the subdivision of the result in multiplication or division operations, and to automatically effect a printing of such subdivision together with the result, a particular object being in event of division to provide means for predetermining the position of the decimal mark for the quotient in an easy manner.

Figure 2:
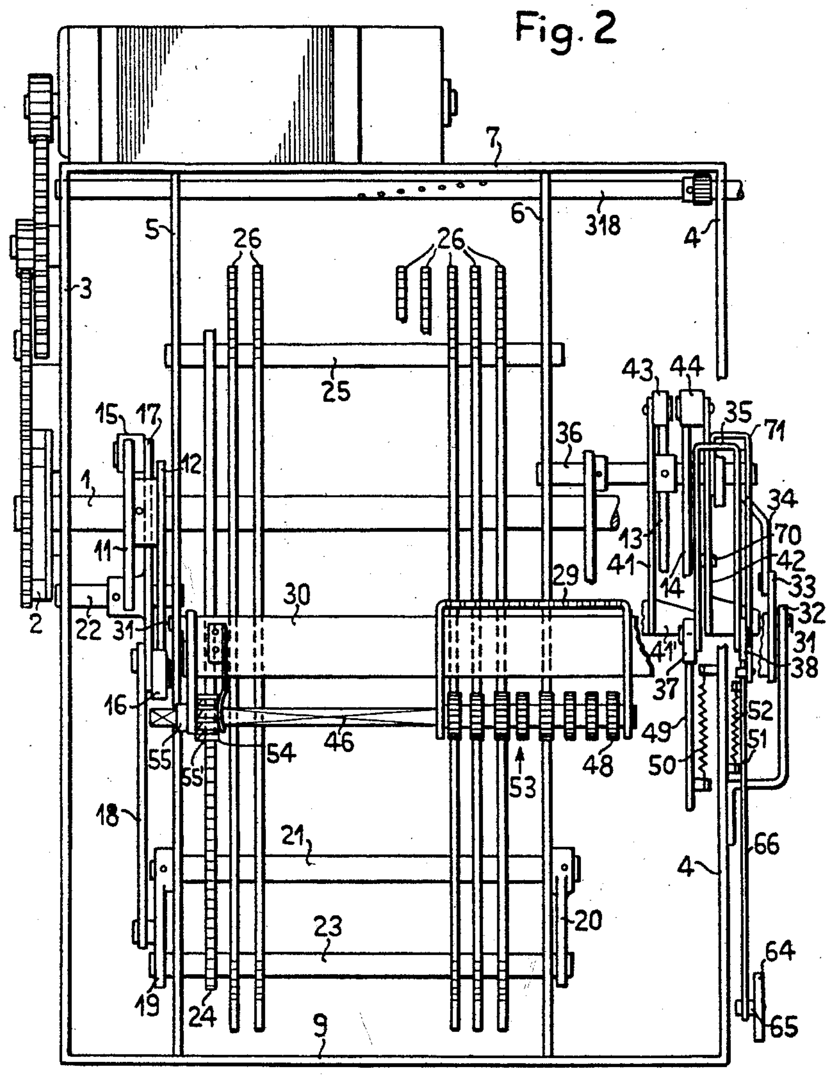
Figures 5, 6, 7, 8:
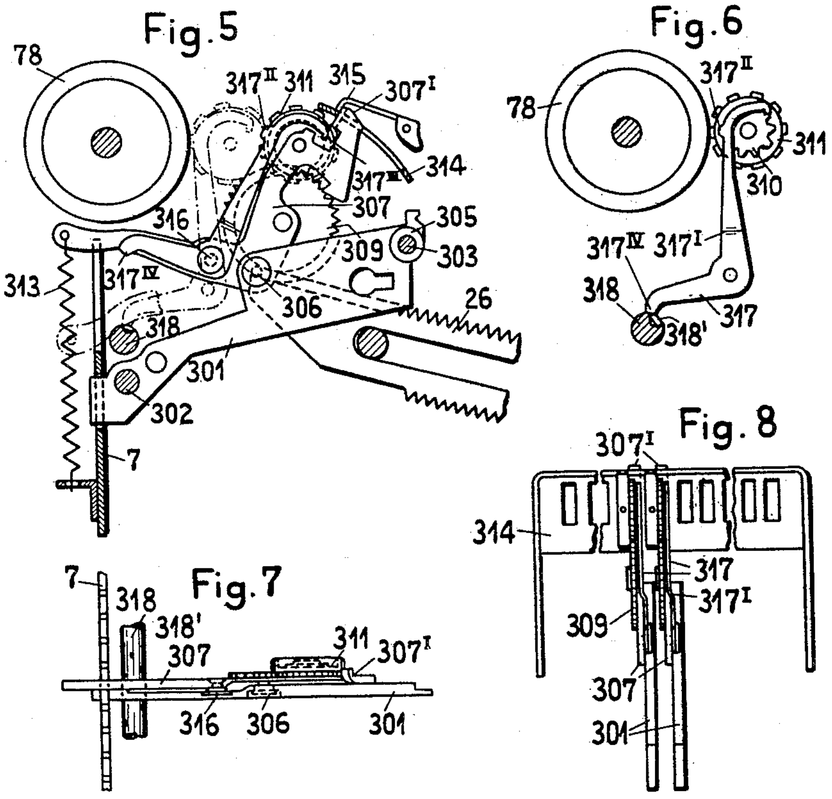
Figure 3:
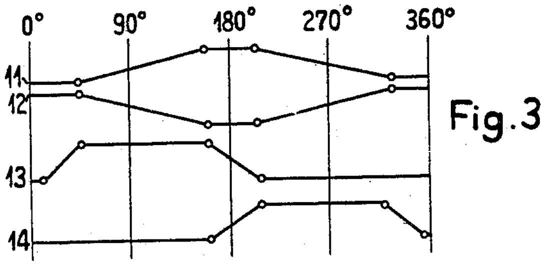
Figures 4, 9, 10:
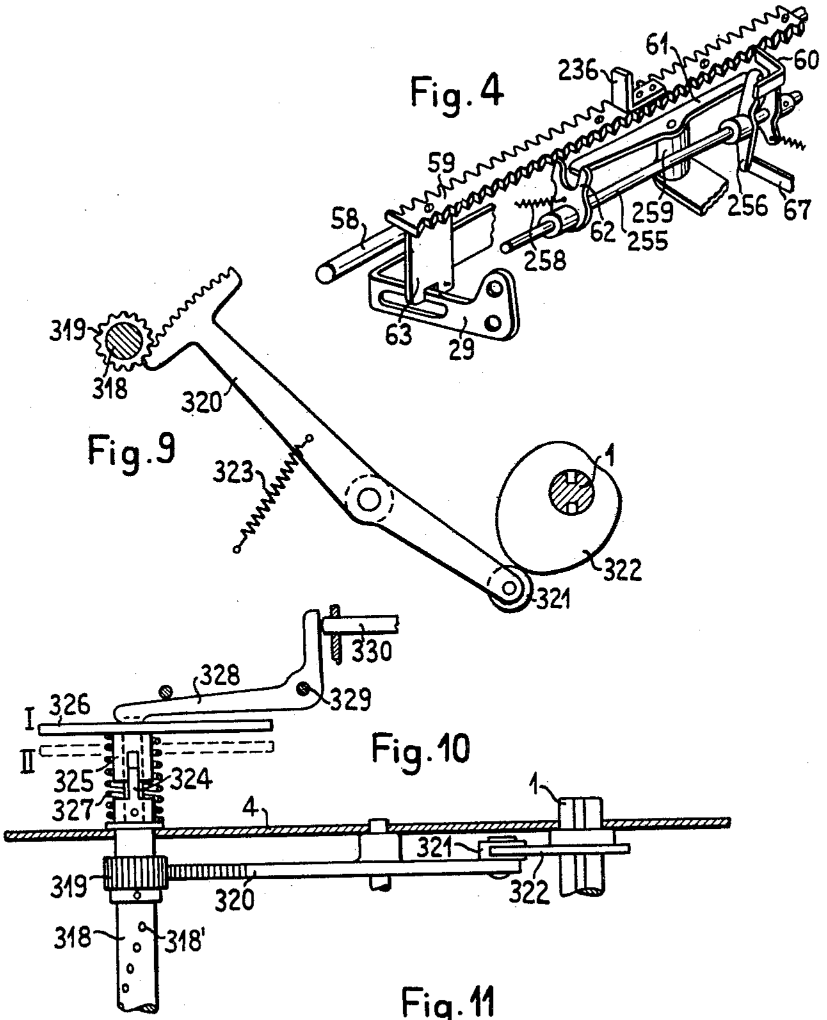
Figure 11:
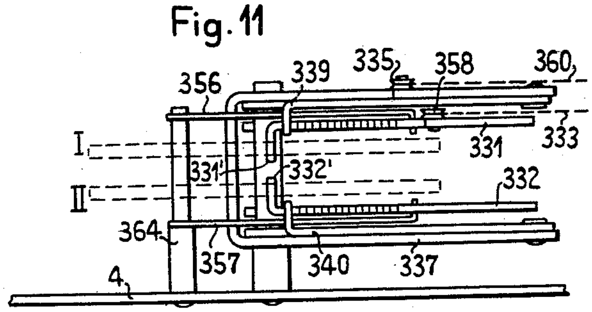
Figures 12, 13:
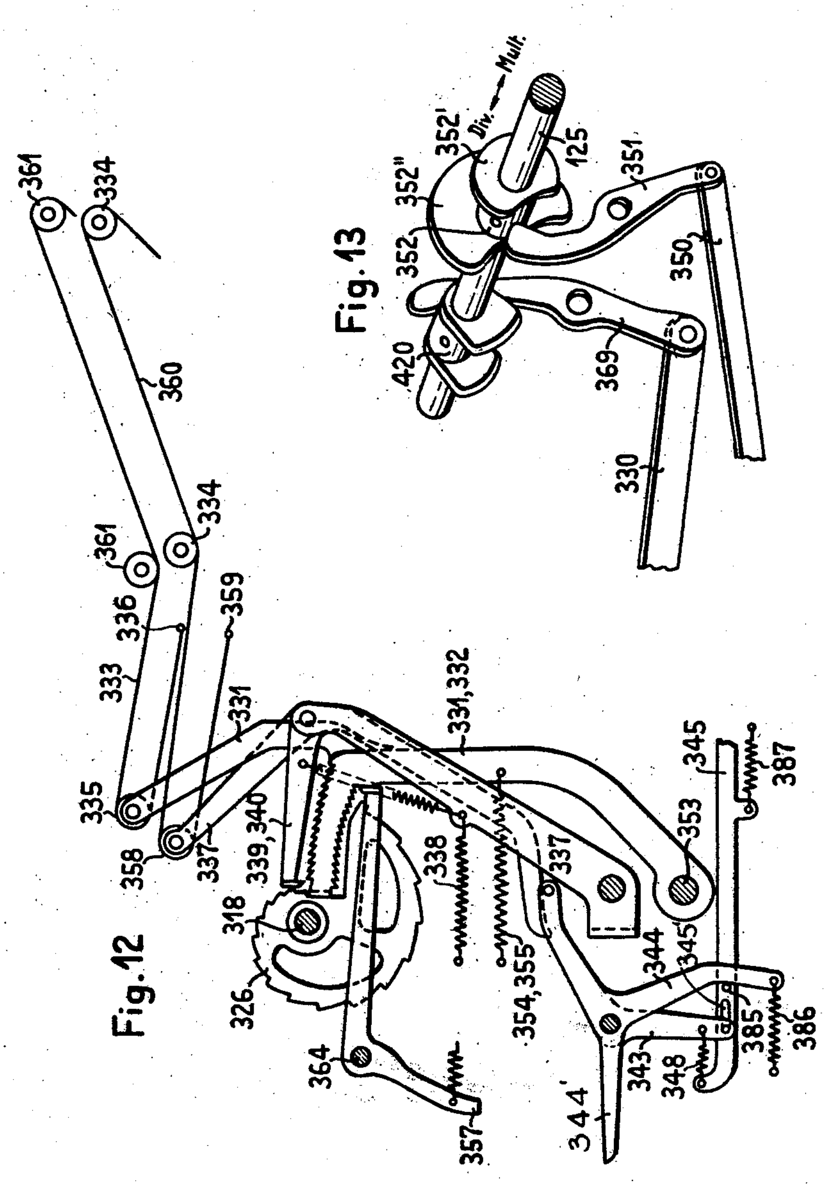
Figures 14, 14A:
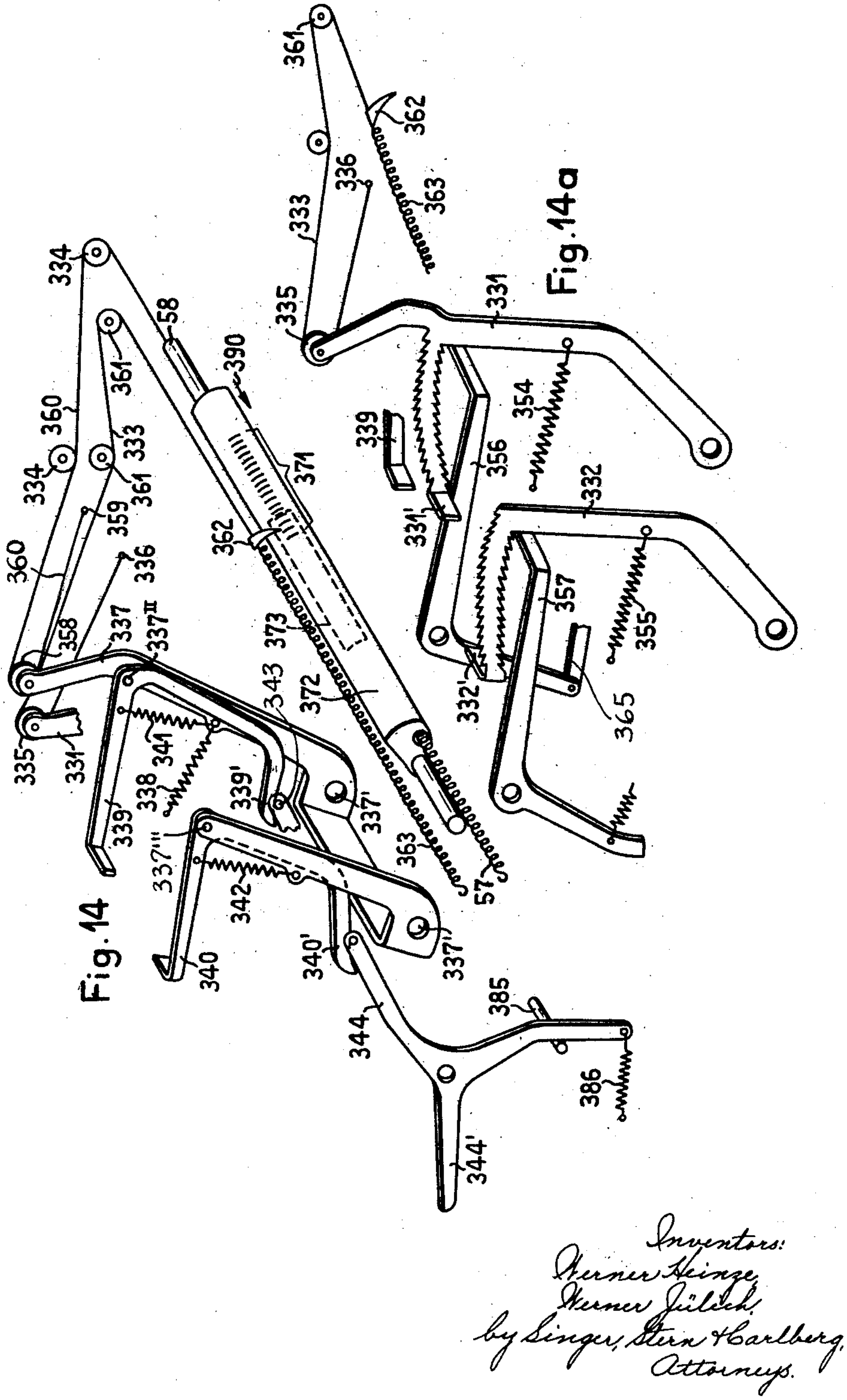
Figure 15:
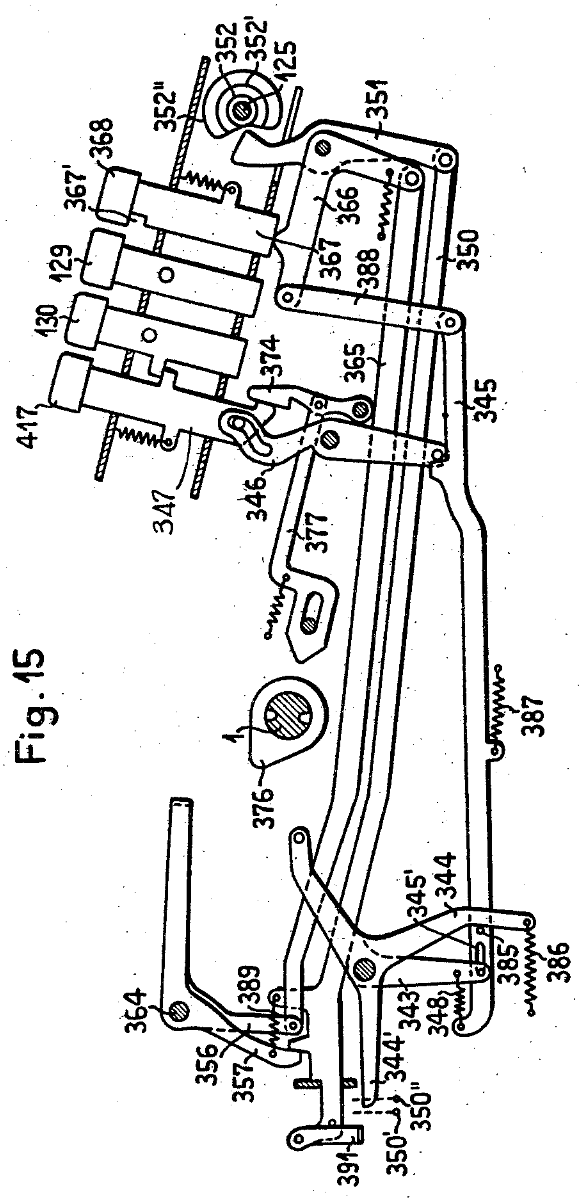
Figure 16:
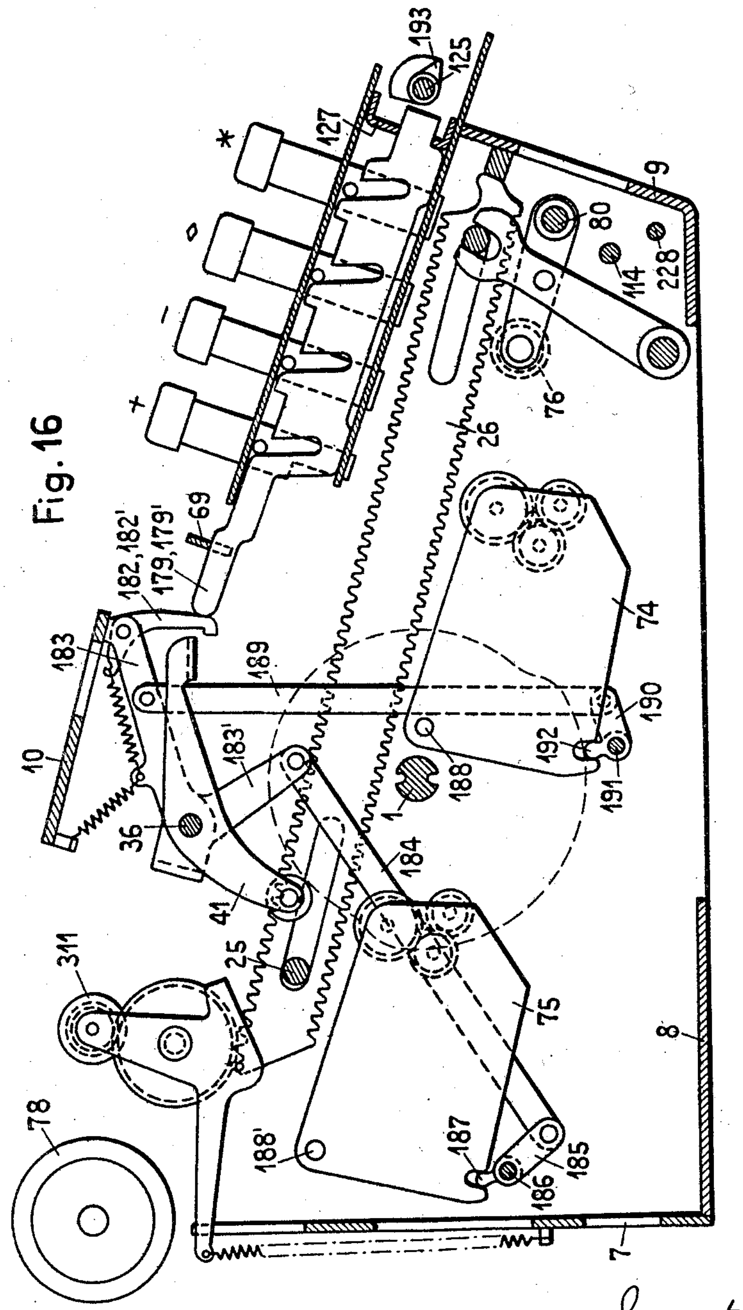

The subject matter of the invention is represented in FIGS. 1 to 50 by way of an example. In the drawings, the following subject matter is shown:

FIG. 1 a cross section taken through the machine,

FIG. 2 a plan view of the machine,

FIG. 3 a graph illustrating the timing of the machine,

FIG. 4 the carriage escapement for the setting mechanism,

FIG. 5 a printing unit,

FIG. 6 details of the printing unit,

FIG. 7 a plan view of the printing unit,

FIG. 8 a side view of the printing unit viewed from the paper platen side,

FIG. 9 the adjusting mechanism for the control shaft,

FIG. 10 a plan view of the control shaft,

FIG. 11 a plan view of controlling elements,

FIG. 12 an elevation of the comma control mechanism,

FIG. 13 the control shaft provided with control cams,

FIGS. 14 and 14*a* details of the comma control mechanism,

FIG. 15 details of the comma control mechanism,

FIG. 16 another cross section taken through the machine.

Figure 17:
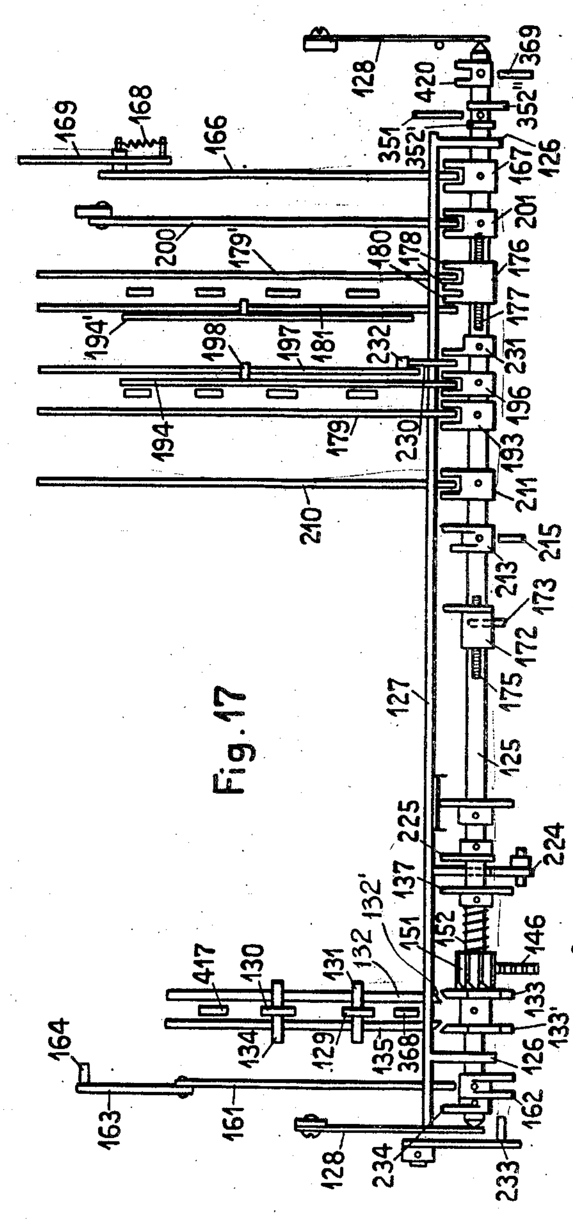
Figure 22:
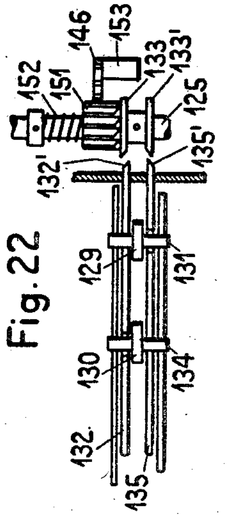
Figure 21:
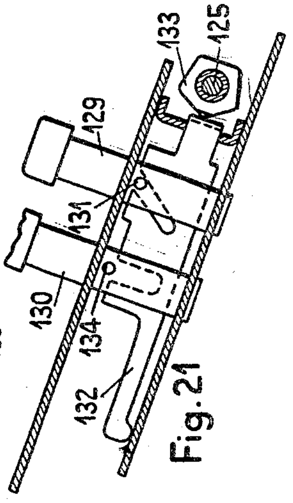
Figure 18:
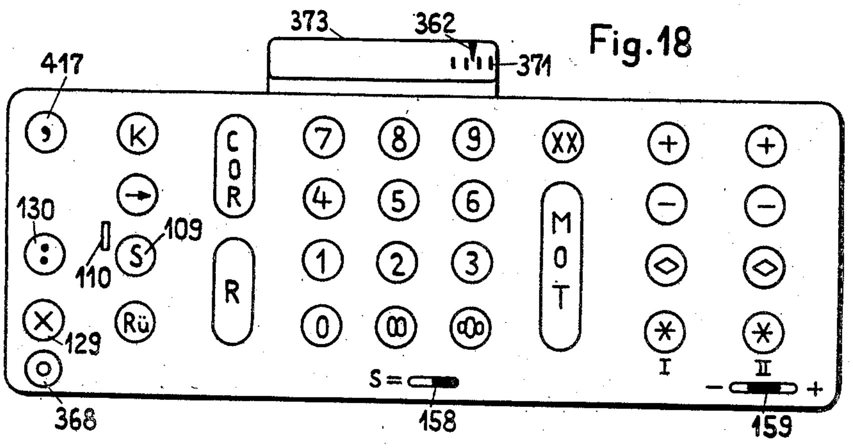
Figures 19, 20:
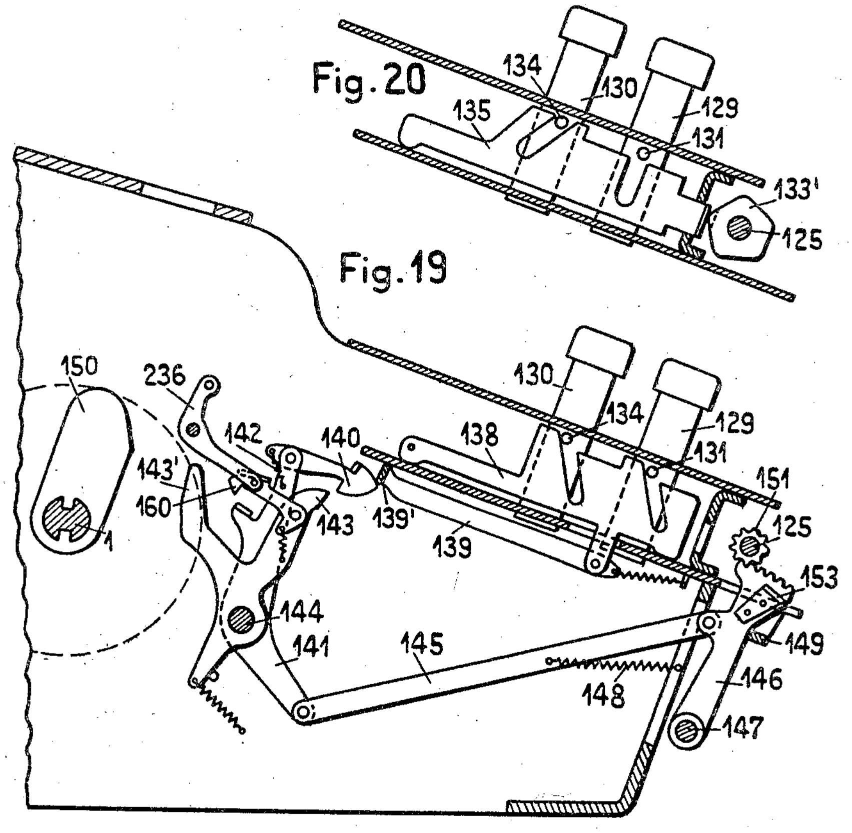
Figures 23, 24, 25, 26:
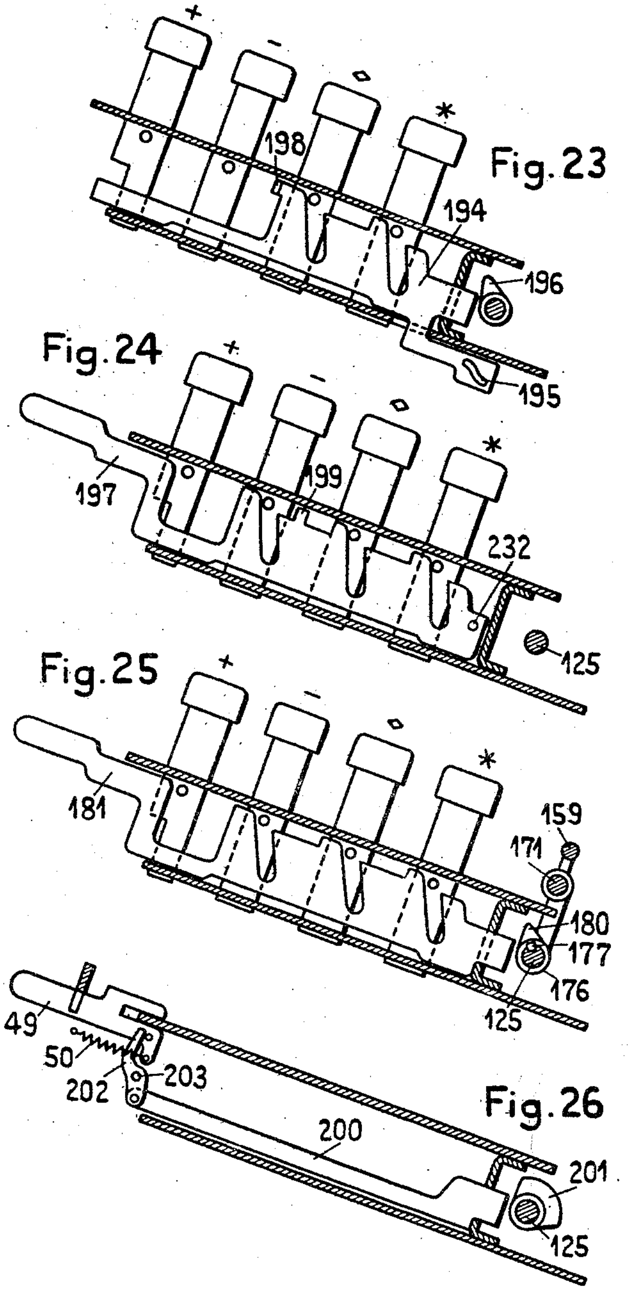
Figures 27, 28:
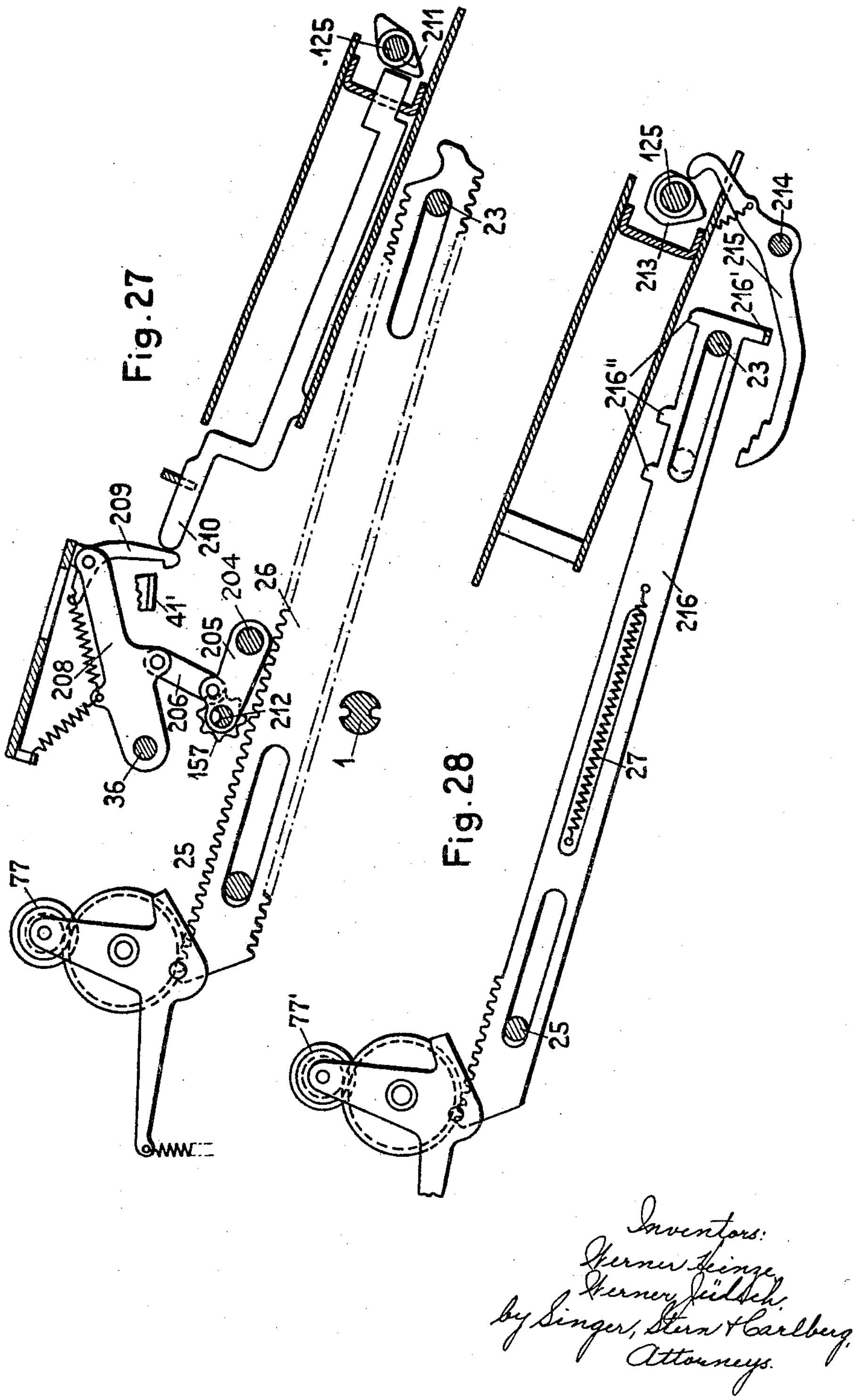
Figures 29, 30, 31, 33A:
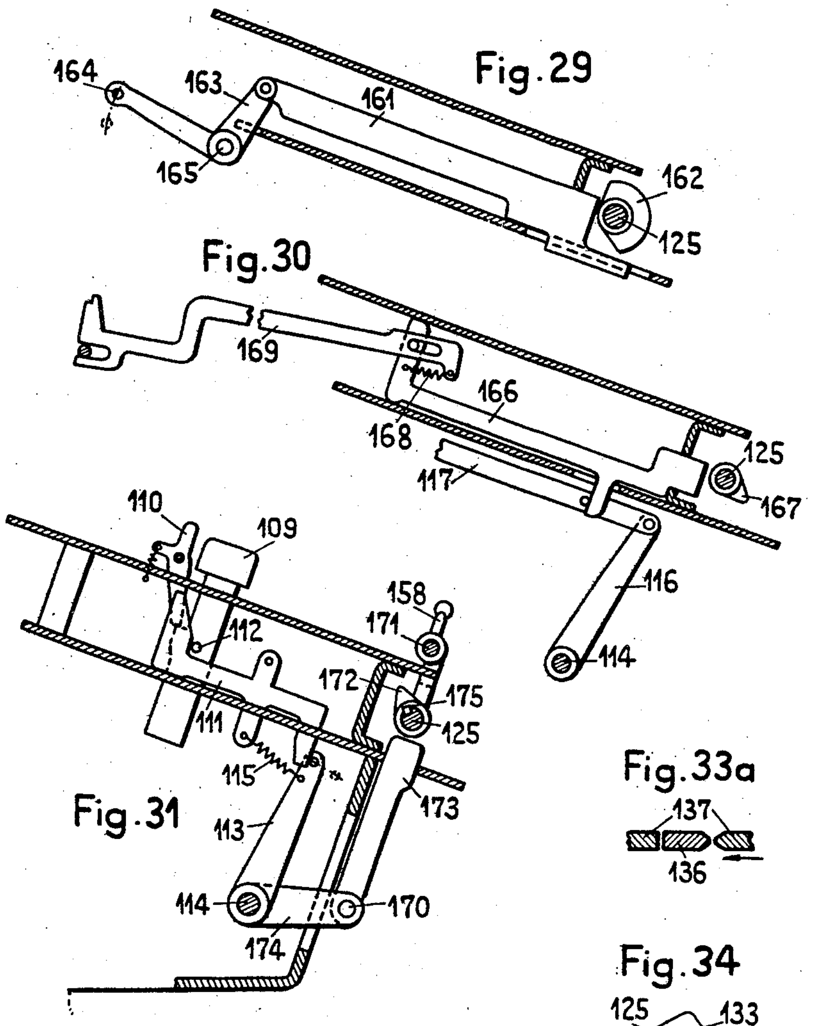
Figure 34:
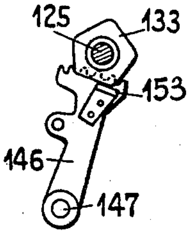
Figure 32:
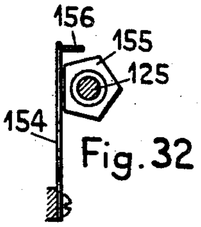
Figure 33:
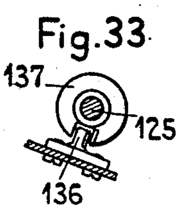
Figures 35, 36, 37, 38, 39:
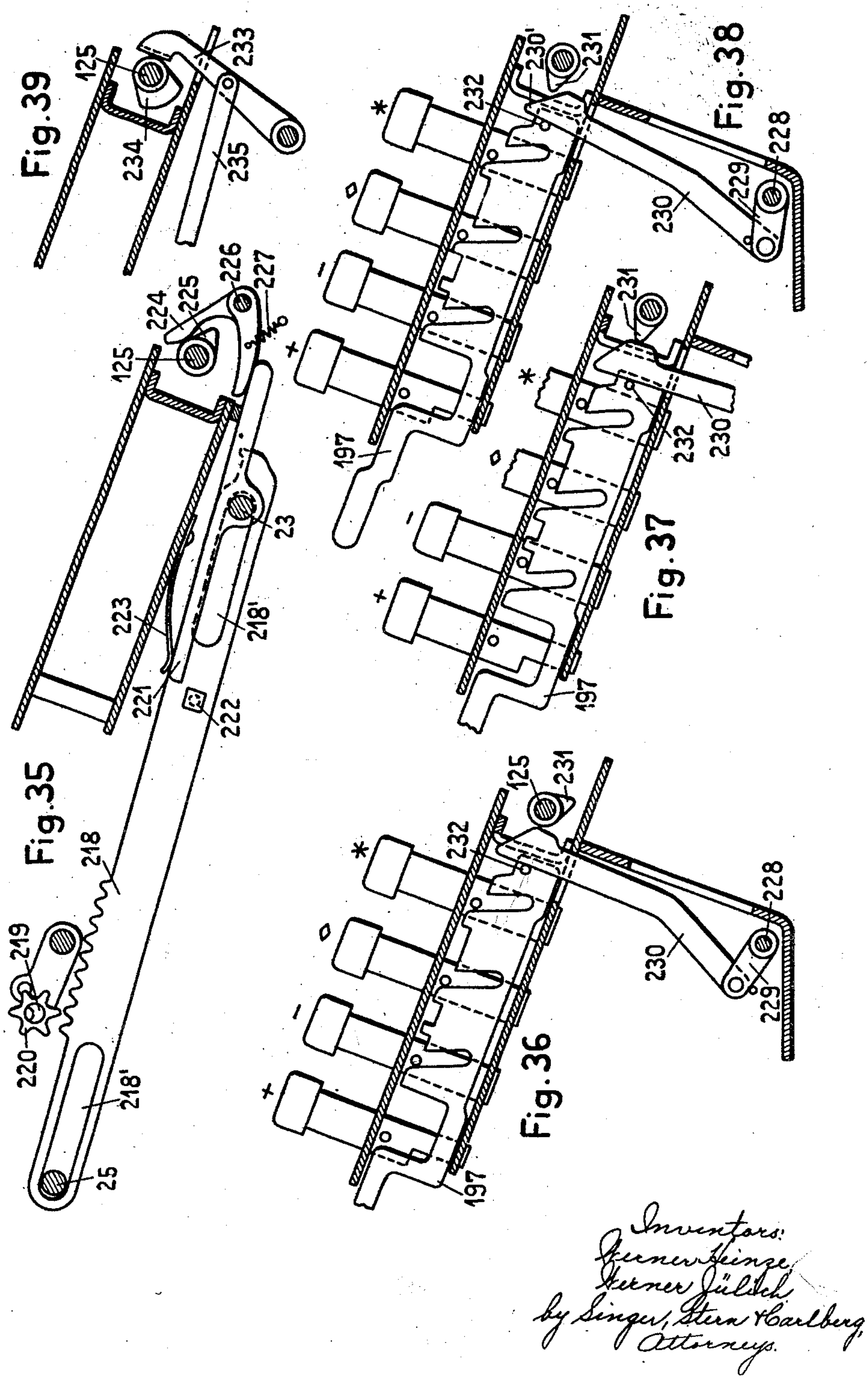
Figures 40, 43:
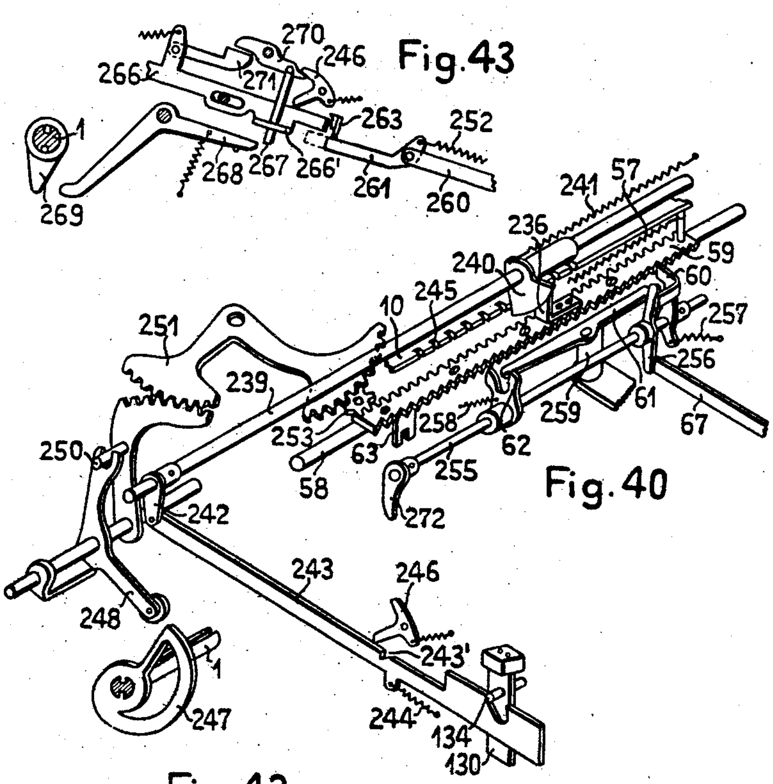
Figure 42:
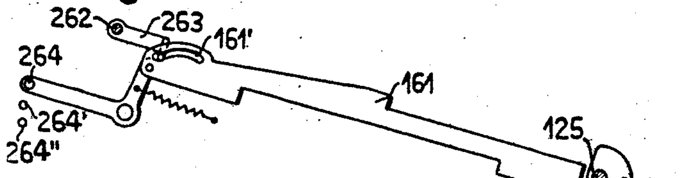
Figure 41:
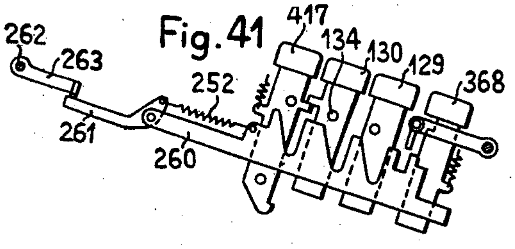
Figures 45, 46, 47, 48, 49, 50:
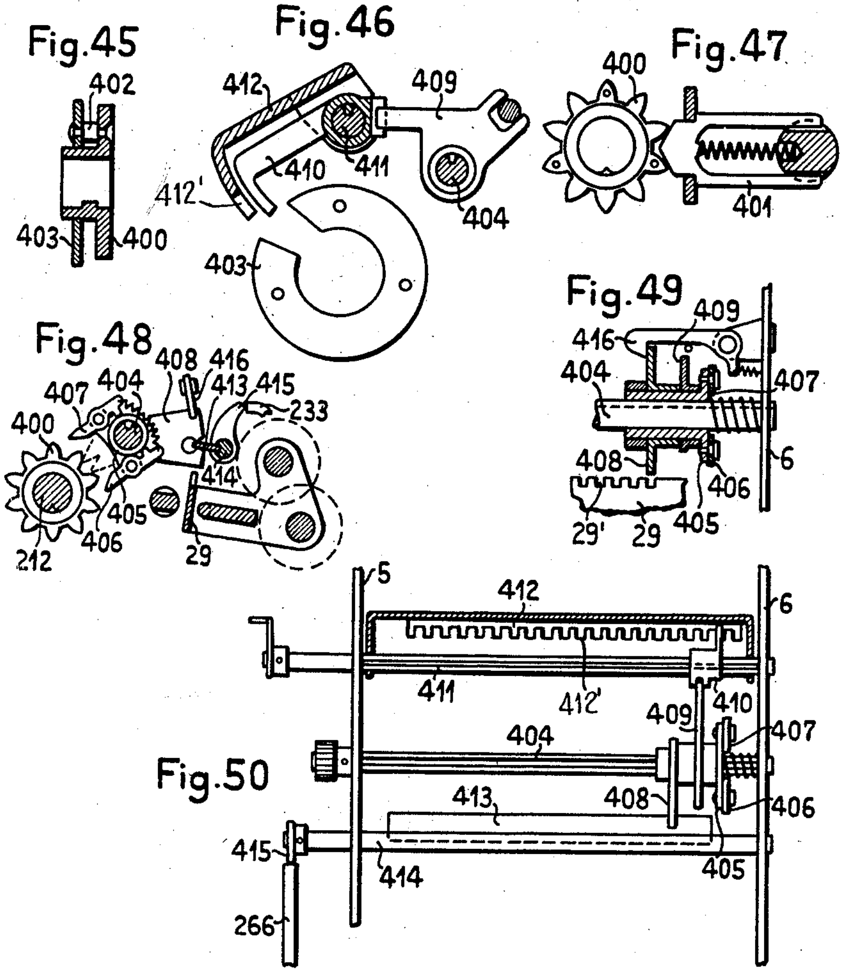

FIG. 17 a plan view of the control shaft,

FIG. 18 a diagram of the keyboard,

FIG. 19 means for driving the control shaft,

FIG. 20 setting-up means for division,

FIG. 21 setting-up means for multiplication,

FIG. 22 a plan view of the means shown in FIGS. 20 and 21,

FIG. 23 setting-up means for clearance,

FIG. 24 setting-up means for subtraction in accumulator I,

FIG. 25 setting-up means for subtraction in accumulator II,

FIG. 26 control mechanism associated with the setting-up means,

FIG. 27 setting-up means for the multiplication-division unit,

FIG. 28 setting-up means for printing marks,

FIG. 29 setting-up means for continuous operation,

FIG. 30 setting-up means for multiplication and division,

FIG. 31 setting-up means for the repeating accumulator,

FIG. 32 detent means for the control shaft,

FIGS. 33 and 33*a* detent means for lateral position,

FIG. 34 escapement lock,

FIG. 35 controlling mechanism for the multiplication-division unit,

FIGS. 36 to 38 control of the addition-subtraction operation for accumulator I,

FIG. 39 setting-up means for division,

FIG. 40 tabulating mechanism for division,

FIGS. 41 to 44 details of the tabulating mechanism,

FIG. 45 a cross section of the multiplication-division gear,

FIG. 46 sensing elements associated with the multiplication-division unit,

FIG. 47 the multiplication-division gear with associated detent means,

FIG. 48 counting and clutching mechanism,

FIG. 49 an elevation of the clutching mechanism, and

FIG. 50 a plan view of the counting and clutching mechanism.

The machine shown in FIGS. 1 and 2 has a frame comprising a bottom 8, the side walls 3, 4, 7 and 9, and a transverse frame member 10. Within the frame formed by said side walls the partition walls 5 and 6 are provided. The main driving shaft 1 is adapted to be driven through the intermediary of a known clutch 2 including pawls rotatably journalled in the walls 3 and 4. Cam disks 11, 12, 13 and 14 are rigidly secured to the shaft 1 by splines, the diagrams of such cams being represented in FIG. 3. The cams 11 and 12 are engaged by the follower rollers 15, 16 mounted on the two ends of the arms of the follower lever 17. This follower lever is fulcrumed on the short shaft 22 extending between the side wall 3 and the partition wall 5 and is pivotally connected with a connecting rod 18, the other end of such connecting rod being pivotally connected with a bifurcated lever 19. This bifurcated lever is rigidly secured to a shaft 21, the other end of which carries a second bifurcated lever 20. As a result, a displacement of the follower lever 17 imparts a swinging movement to the two bifurcated levers 19, 20 and a rotary movement to the shaft 21. The bifurcated ends of the bifurcated levers 19 and 20 straddle the collecting shaft 23 which is movably guided in longitudinal slots of the walls 5, 6. A rack 24 is mounted on the collecting shaft 23 and thus participates in all forward and rearward movements of the collecting shaft. The rear end of the rack 24 is provided with a longitudinal slot and straddles the fulcrum shaft 25 and is thus guided for longitudinal displacement. The rack 24 also cooperates with the setting mechanism through the intermediary of gear teeth 54, 55' in the manner to be described later.

The setting mechanism which, in a known manner, is actuated by keys includes a U-shaped yoke member 29 movably guided on the pivotal rail 30 having a rectangular cross section. The ends of this rail 30 are provided with studs 31, one of the studs being journalled in the wall 5 and the other stud 31 being journalled in a bracket 32 secured to the wall 4. A swinging movement of the rail 30 about the axis of its studs 31, therefore, causes a similar pivotal movement of the yoke 29 and of the elements supported thereby. This pivotal movement is effected by an arm 33 mounted on the pivotal rail 30, such arm being connected by a connecting rod 34 with the lever 35 which is loosely mounted on the shaft 36. The lever 35 has a pair of parallel upright arms 35', each of which carries a pawl 37, or 38 respectively. These pawls are pivotally mounted on the arms 35' and are subjected to the force of springs 39 tending to turn the pawls in anti-clockwise direction (FIG. 1).

A spring 40 has one end connected to the transverse frame member 10 and the other end connected to one of the arms 35' and thereby tends to pivot the entire lever 35 about the shaft 36 in anti-clockwise direction (FIG. 1). As a result, the upper ends of the arms 35' are caused to engage the transverse frame member 10.

Moreover, the follower levers 41 and 42 are loosely mounted on the shaft 36. These levers at their ends carry rollers 43, 44 engaging the cams 13, 14. The upper ends of the levers 41 and 42 are provided with laterally bent lips 41' and 42' disposed in opposed relationship to the lower hook-shaped ends of the pawls 37, 38. These pawls may be swung to the left individually or in unison by slides coordinated to the keys to be brought into engagement with the lips 41' and 42'. A subsequent swinging movement imparted to the follower levers 41 and 42 by their cams 13, 14 causes the levers 35' and the lever 35 to be swung in clockwise direction contrary to the effect of the spring 40. This causes the pivotal rail provided with the yoke 29 and the elements carried thereby to be swung in clockwise direction through the intermediary of the connecting rod 34 and the arm 33.

The yoke 29 on the shafts 45 and 46 carries a pair of sets 47 and 48 of gears having ten teeth for cooperation with the computing racks 26.

The shaft 46 is designed as the clearing shaft, substantially as described in the German Patent No. 727,923, and serves as the actuating element for the computing operation. The left hand section of the shaft 46 has a rectangular cross section. The one-way clutch teeth 55' are resiliently urged by a clutch member 55 to engagement with similar clutch teeth provided on a gear 54. As above mentioned, the gear 54 engages with the rack 24. When the rack moves forwardly, the shaft 46 is rotated. When the movement takes place in the opposite direction, however, the shaft 46 is not rotated because the one-way clutch teeth of the gear 54 will ride over the clutch teeth of the pinion 55' which may yield in axial direction.

The computing racks 26 provided with teeth along their upper edge and along their lower edge extend fore and aft in the machine and their front ends and their rear ends are provided with longitudinal slots 27 being movably guided on the collecting shaft 23 and on the supporting shaft 25. For the lateral guidance of the racks 26 a pair of combs are provided which are not shown in the drawings. In their resting positions the computing racks 26 are kept in abutting relationship to the stop bar 28 by the collecting shaft 23, such stop bar being secured to the front wall 9.

As above mentioned, a pair of slides 49 and 51 cooperate with the pawls 37 and 38. The slide 49 is pulled to the left (FIG. 1) by the spring 50 and thereby permanently urges the pawl 37 into engagement with the lip 41', the force of spring 39 being overcome by the spring 50. The second slide 51 is pulled to the right by the spring 52 and is disposed opposite to the pawl 38 without acting on the latter in resting condition. Thus, the pawl 38, contrary to the pawl 37, does not engage the associated lip 42' when in resting position. The slide 51 can be moved to the left by the multiplication mechanism through the intermediary of suitable means, such mechanism and such means being not shown in the drawings.

As mentioned above, the setting mechanism is mounted for lateral movement on the pivotal rail 30. The lateral movement is effected by a spring 57 (FIGURE 40), one end of the spring being anchored to the machine frame and the other end being anchored to a shaft 58 mounted for axial displacement. The shaft 58 is rigidly connected with the carriage escapement rack 59 which cooperates in a known manner with the escapement levers 60 and 62 and controls the intermittent denominational movement of the setting mechanism when numerical items are set up under control by the numerical keys and also controls the intermittent movement of the setting mechanism in multiplication and division operations. A connecting angle 63 establishes the connection between the shaft 58 and the yoke 29.

Each of the computing racks 26 is in permanent driving connection with a type wheel 311 (FIG. 5) through the intermediary of a pinion 309, said pinion and said type wheel being loosely rotatably mounted on the printing lever 307.

Each denominational unit of the printing mechanism (FIGS. 5, 6, 7 and 8) is composed of the following parts: The stationary cheek plate 301 carried by the shafts 302 and 303 is laterally guided by the wall 7, intermediary spacer rings 305 being mounted on the shaft 303 to effect an accurate lateral spacing in the upper right hand corner (FIG. 5). At the point 306 a headed pin is rotatably mounted which is riveted in the printing lever 307. The printing lever carries another pin riveted in position on which the intermediary pinion 309 is loosely rotatably mounted for engagement with a gear 310 secured to the type wheel rim 311. The gear 310 is likewise rotatably mounted on a pin firmly riveted in the printing lever 307 for free rotation.

The center 306 of rotation is so chosen that the intermediary pinion 309 will permanently engage the rack 26 irrespective of whether the printing lever 307 is in its front position or in its rear position.

The left hand arm of the printing lever 307 is guided in a slot of the wall 7 and at its end carries a traction spring 313 tending to turn the printing lever 307 in anticlockwise direction as viewed in FIG. 5. The upper end 307' of the printing lever is guided in a slot of the restoring yoke 314 mounted for angular movement about the center 306. The upper end 307' of the printing lever is held by a pivotal locking member 315 against the action of the traction spring 313. On a pin 316 riveted in the printing lever the punctuation lever 317 is freely rotatably mounted. At the point 317' this lever 317 is bent into the plane of the printing lever and carries the punctuation mark disposed at the point 317''. The nose 317''' engages a recess provided in the printing lever 307 whereby the mobility is limited laterally on both sides.

A control shaft 318 mounted in the stationary frame is provided with recesses 318' (FIGS. 6 and 7) which are so helically distributed on the control shaft 318 that in each denominational unit one or a plurality of recesses are provided on the periphery of said control shaft, and that the control shaft can be turned as many rotational steps as the computing machine comprises denominational units. Hence, where the machine has seventeen denominations, the control shaft is so constructed that any rotational step through 1/17 of a revolution causes a recess to disappear in one denominational unit and another recess to appear in the following denominational unit. Where a plurality of recesses are provided in a denominational unit, it is possible to provide all three denominations of a subdivision punctuation at the left of the denominational mark constituted by a comma.

As soon as the computing racks 26 have arrived in their upper positions corresponding to the numerical amount, the restoring yoke 314 moving in anti-clockwise direction has arrived in its frontmost position and has lifted the locking member 315 whereby the noses 317''' have been released permitting the spring 313 to accelerate the printing lever 307 in the same direction of rotation. This causes the type wheel 311 to hit the paper platen 78 effecting an imprint of the number type set up on the type wheel. The ribbon is not illustrated in order to simplify the drawing. Since the punctuation lever 317 is pivotally mounted on the printing lever 307, this lever participates in the acceleration and causes its point 317″ to be imprinted, provided that the portion $317^{IV}$ is in registry with a recess 318′ of the control shaft. In such denominational units where no such recess is in registry with the part $317^{IV}$, the latter engages the periphery of the shaft whereby the point $317^{II}$ of the printing lever is kept in spaced relationship to the paper platen and prevented from effecting a printing operation.

The operation of the machine will be briefly described as follows:

One cycle of operation, i.e. an addition operation or a subtraction operation, is effected within one revolution of the main driving shaft, whereas a multiplication operation is carried out as a repeated addition in different denominational positions, the setting unit being displaced the required denominations for this purpose. Similarly, a division operation is carried out by repeated subtraction until the amount subtracted is in excess of the amount accumulated. In that event, a positive revolution occurs. The revolution to be described hereinafter refers to one of the repeated revolutions of a multiplication. In accordance with the diagram (FIG. 3) the setting mechanism is connected with the racks by the cam 13 and, at the same time, the accumulator 74 or 75 or both accumulators are engaged with the racks, the lever 41 acting through the intermediary of a pawl similar to the pawl 37 and through the intermediary of a linkage engaging the accumulator with the bottom teeth of the racks. By means of the cam 11 acting through the intermediary of the parts 17, 18, 19 and 23 the rack 24 is moved to the left with reference to FIG. 1 and through the intermediary of the pinion 54 rotates the clearing shaft 46 in clockwise direction through $9/10$ of one revolution. This will return the gears 48, 47 which by the keyboard have been set up to a predetermined numerical value to their initial positions, the racks 26 being displaced corresponding amounts. Also the accumulator or both of the accumulators have accumulated this amount (when addition or subtraction are performed printing may be effected in the upper dead center position, since as shown in the cam diagram the cams 11 and 12 have a dwell extending from about 170° to 190° resulting in a temporary rest). The accumulator which is connected with the cam 13 only is disengaged again and during the rotation from 190° to 360° the ten-carrying operation is carried out which is not described herein as it does not form part of the present invention. In order to repeat the addition of an amount for the purpose of multiplication or to repeat a subtraction for the purpose of division, the setting mechanism is connected with the racks also during the return movement through the intermediary of cam 14, follower lever 42, pawl 38, and parts 35, 34 and 33 so that the collecting shaft 23 which restores all of the racks will also restore the gears 47 and 48 to their initial positions, that is to say to their numerical positions. This cycle may be repeated as often as desired, the number of revolutions in a multiplication operation being controlled by the multiplier unit, a gear of the multiplier unit being stepwise returned to zero in a known manner one step at any revolution.

The control required for the automatic performance of a multiplication will be described hereinafter. The basis of the automatic control for multiplication and division is established by a control shaft 125 (FIGS. 16 and 17) which controls the entire computing and transferring operation of the machine and is selectively advanced by hand or by automatic control means phase by phase.

The control shaft 125 (FIGS. 16 and 17) is journalled in brackets 126 secured to a frame member 127. A pair of leaf springs 128 engage the frame member 127 and keep the control shaft in the resting position shown. The control shaft is movable to the right for multiplication and to the left for division, the right hand leaf spring 128 or the left hand leaf spring 128 being operative at any time to move the control shaft back into resting position. This movement is performed by the keys 129, 130 (FIGS. 17, 20, 21 and 22). The multiplication key 129 has a pin 131 which, when the key is depressed, acts on the slide 132 moving the same to the right as viewed in FIG. 21 causing the inclined front face 132′ of the slide to act on an inclined face of the pentagonal disk 133. As this disk is secured to the control shaft by a pin, the shaft is moved to the right with reference to FIG. 17. The division key 130 has a pin 134 which, when the key is depressed, acts in a similar manner on the slide 135 moving the control shaft 125 to the left. Springs not shown tend to move the keys to their upper positions, but the keys are kept in their depressed positions by other elements not shown as long as the initiated revolutions of the main shaft continue. It will appear from the slots of the slides 132 and 135 disposed beneath the pins 131 and 134 that it is impossible to depress both keys 129 and 130 simultaneously. Depression of one of the keys prevents the other key from being depressed. The control shaft is not only moved laterally for bringing the cams for multiplication or division into effective position, but is also turned in clockwise direction (e.g. FIGS. 20 and 21) in five steps for the purpose of controlling various elements at different times. The rotational resting position of the control shaft is determined by a stationary nose 136 (FIG. 33) provided on the frame of the machine, such nose engaging a slot of a disk 137 (also FIG. 17) secured to the control shaft.

FIG. 33*a* illustrates the engagement of the nose 136 with the disk 137 showing that both elements are somewhat beveled in direction of rotation. As a result, the control shaft may be turned in forward direction even if it should not have been properly positioned by lateral displacement effected by the slides 132 and 135. The nose 136 at the same time ensures the lateral displacement of the control shaft during the stepwise operation during the entire revolution also when the slides 132 and 135 have been returned to their initial positions.

The stepwise operation of the control shaft (FIGS. 17, 19 and 34) is initiated by one of the keys 129 and 130, the pin 131 or 134 acting on the slide 138 moving the slide 138 and a pawl 139 pivoted thereto to the left in FIG. 19. Hence, a bent lip 139′ of the pawl 139 is caused to engage the latch 140 rocking the same in clockwise direction. The latch 140 is pivoted to a lever 141 and is subjected to the force of a spring 142 tending to turn the latch 140 in anti-clockwise direction. Therefore, the latch 140 will engage the actuating lever 143. The lever 141 which is freely rotatably mounted on a shaft 144 is connected by a link 145 with a toothed sector 146 which is freely rotatably mounted on a shaft 147. A spring 148 pulls the elements just described into resting position in which the toothed sector engages a stationary stop 149. At the same time, a revolution of the main shaft has been initiated by the keys in a manner that need not be described as it does not form part of the invention. During the revolution of the main shaft 1 a cam 150 acts on the arm 143′ rocking the actuating lever 143 in clockwise direction and swinging the toothed sector 146 in anti-clockwise direction through the intermediary of the elements 140, 141 and 145 whereby the gear 151 engaging the toothed sector will be turned in clockwise direction through $1/5$ of a revolution. This gear 151 is freely rotatably mounted on the control shaft 125 and has clutch teeth engaging corresponding clutch teeth of the disk 133 (FIG. 17) whereby the gear 151 will rotate the control shaft in clockwise direction through said $1/5$ of a revolution and when returning will permit the control shaft to remain at rest. A pressure spring 152 keeps the two sets of clutch teeth resiliently in engagement. In order to prevent any overthrow of the control shaft in clockwise direction after the rapid actuation, an angular member 153 (FIGS. 19 and 34) is riveted to the toothed sector 146, such member cooperating with the five faces of the disk 133 arresting the same in its final position (FIG. 34). The control shaft is held in the different phases of the operation by a detent spring 154 (FIG. 32) which presses upon the faces of the disk 155, whereas in resting position the disk 155 is not engaged as it is slightly offset permitting the spring to engage a stationary stop 156. As a result, the control shaft may be easily moved in axial direction by the keys and may be easily returned by the light springs 128.

The manipulation and the operation of the machine for multiplication are as follows:

(1) The multiplier is set up by means of the keys 0–9.

(2) The multiplication key 129 is depressed. When the revolution of the main shaft commences, the control shafts sets up the machine to perform the first phase whereby (parts 211, 210) the multiplication-division unit is put into operation and the multiplier is set up therein, and whereby the mark printing mechanism is set to ×. The multiplier is printed and the setting mechanism is restored to its starting position.

(3) The multiplicand is set up by means of the keys 0–9. Moreover, the following operations may be optionally performed:

The accumulator key 109 is depressed and the slide 158 (FIGS. 18 and 31) is set up to S= whereby the product is transferred into the accumulator. The slide 159 is set up to +II whereby the product is additively introduced into the accumulator II (FIGS. 18 and 25).

(4) The multiplication key 129 is depressed again whereby rotation is imparted again to the main shaft of the machine and the control shaft at the commencement of this operation is set to the second phase thereby controlling the machine in accordance with the following table:

(*a*) Continuous operation of the machine
(*b*) Sign printing mechanism to ×
(*c*) Accumulator I put into operation
(*d*) Printing mechanism and repeating accumulator mechanism put out of operation.

Subsequently the multiplication is carried out, the machine in the various denominations performing as many revolutions as correspond to the digits of the multiplier.

After the multiplication has been completed the pawl 160 (FIG. 19) will be engaged by the lever 236, and the control shaft will be turned through one fifth of a revolution on any further revolution of the main shaft.

In the third phase this operation causes the setting mechanism to be moved to the right (FIG. 2) to its initial position and will cause in the fourth phase the accumulator I to be cleared, the product being simultaneously transferred to the repeating accumulator and additively introduced into the accumulator II. Moreover, the sign printing mechanism will be set to print = and the product will be printed. In the fifth phase the setting mechanism will be cleared.

The operation of division is as follows:

(1) The dividend is set up by means of the number keys 0–9.

(2) The division key is depressed. At the commencement of the revolution of the main shaft the control shaft sets up the mechanism to perform the first phase. As a result, the accumulator I is actuated (193, 179) and the sign printing mechanism is set to print ":" (213, 215). The dividend is printed and the setting mechanism is restored to the initial position.

(3) The divisor is set up by means of the number keys 0–9. Moreover, optionally any one of the following operations may be performed: The accumulator key 109 is depressed and the slide 158 (FIGS. 18 and 31) is set to S= whereby the quotient will be transferred into the accumulator. The slide 159 (FIGS. 18 and 25) is set to minus II whereby the quotient is subtracted in the accumulator II.

(4) The division kep is depressed again. As a result, the machine is cycled again and at the commencement of the cycle the control shaft is set to perform the second phase and, according to the following table, the following operations are set up:

(*a*) Continuous revolution of the main shaft
(*b*) Sign printing mechanism to print :
(*c*) The accumulator I is put into operation
(*d*) The accumulator is set to plus-minus
(*e*) The printing mechanism and the repeating accumulator are put out of operation.

The division is carried out and the cycles of operation are recorded in the multiplication-division mechanism and subsequently the pawl 160 is engaged by the stop lever 236 (FIG. 19) whereby in any revolution of the main shaft following thereafter the control shaft is turned one fifth of a revolution.

As a result, the accumulator I will be cleared in the third phase and any rest that might remain will be printed. In the fourth phase the multiplication-division mechanism is cleared and the quotient is transferred into the repeating accumulator and is subtracted in the accumulator II. In the fifth phase the setting-up mechanism is cleared. The following table shows the phases of the operations for multiplication and division described above.

*Table (Listing structural parts to perform the operations of the various mechanisms for the actuations in the different phases of operation for multiplication (×) and division (0))*

| | (5) | 1 | 2 | 3 | 4 |
|---|---|---|---|---|---|
| Stoppage after division (234, 128) | — | — | — | 0 | 0 |
| Continuous operation of the machine (162, 161). | — | — | × 0 | × 0 | × 0 |
| Clearance for the quotient (225, 224) | — | — | — | — | 0 |
| Control of the repetition accumulator (172, 173). | — | — | — | — | (× 0) |
| Printing of marks (× : =) (213, 215) | — | × 0 | × 0 | × 0 | × 0 |
| Putting mult.-div. unit into operation (211, 210). | — | × | — | — | 0 |
| Putting accumulator I into operation (193, 179). | — | 0 | × 0 | 0 | × |
| Clearing accumulator I (196, 194) | — | — | — | 0 | × |
| Actuating accumulator I for division, addition and subtraction (230, 231). | — | — | 0 | — | — |
| Addition operation of accumulator II (178, 179). | — | — | — | — | (× 0) |
| Subtraction operation of accumulator II (178, 179′, 180, 181). | — | — | — | — | (× 0) |
| Putting setting-up mechanism out of operation (201, 220). | — | — | — | X 0 | × 0 |
| Putting printing mechanism and repetition mechansim out of operation. | — | — | × 0 | — | — |

In FIG. 16 the slide 179 is shown which causes the accumulator I (74) to be swung about the point 188 through the intermediary of the elements 182, 183, 189, 190, 191 and 192 for the purpose of engaging the accumulator with the racks 26 at +, —, total and running total. Anyone of the keys +, —, ◇′, * for accumulator I (compare FIG. 18) may act on the slide 179, or the slide 179 may be actuated by the cam 193 directly.

FIG. 23 shows the clearance slide 194 for the accumulator I which is required for effecting the clearance. The cam slot 195 renders the clearance linkage effective, which is not shown herein as it does not form part of the present invention. The keys ◇′, * act likewise on the clearance slide and, since the clearance operation always requires that a subtracting operation be performed, the bent lip 198 carries the subtracting slide 197 along engaging same at the projection 199 (FIG. 24). Each of the keys —, ◇, * act on the subtracting slide 197 of the key row I, whereas the subtracting slide 181 of the key row II (FIG. 25) is additionally actuated by the cam 176 and, more particularly, by the nose 180.

FIG. 26 illustrates the slide 200 which is actuated by the cam 201, the slide 200 being operative through the intermediary of the lever 202 fulcrumed in the point 203 to pull the slide 49 to the right contrary to the effect of its spring 50, whereby the set-up mechanism will be prevented from getting into engagement with the racks 26 in the appropriate phases of the operation.

In FIG. 27 there is shown the mechanism which causes engagement of the multiplication-division unit 157 with the computing racks. The multiplication-division unit 157 is mounted on the shaft 204, the two arms 205 of which accommodate the clearing shaft 212.

The slide 210 will be shifted to the left by the cam 211 at appropriate times, and the pawl 209 will be brought to engagement with the lip 41′ which, when the machine is cycled, pivots the lever 208 in clockwise direction whereby the multiplication-division unit will be swung by the connecting rod 206 into engagement with the racks 26.

FIG. 28 indicates the sign printing mechanism.

For accurately characterizing the computing operations the items are provided in a known manner laterally with a sign:

| | | | |
|---|---|---|---|
| Multiplication | 25 × | Division | 658 : |
| | 26 × | | 25 : |
| | o | | 8 o (rest) |
| | 650 = + | | 26 = + |

The plus sign adjacent to = means that the amount has been added into the accumulator II.

The sign printing rod 216 is guided on the shafts 25 and 23, and a spring 217 pulls the sign printing rod 216 to the left. In its resting position part 216 contacts the collecting shaft 23 and tends to follow the same during the advance and the return of the collecting shaft 23. The sign printing rod 216 is geared with the sign type wheel 77′ through a gear. The noses 216″ serve as stops for the signs +—◇*, the sign types being struck by actuation of the respective keys. The sign printing lever 215 mounted on the shaft 214 cooperates with the bent lip 216′, and the individual steps constitute the abutments for the signs × : and =. The cam 213 which has noses of different height sets up the sign printing lever 215 accordingly.

FIG. 29 illustrates the slide 161 for continuous cycling of the machine which is actuated by the cam 162 being kept in its left hand position in the second, third and fourth steps of the revolution, the lever 163 fulcrumed about the point 165 being swung in anti-clockwise direction, the pin 164 being brought into its lower position in which it acts on means not shown herein as they do not form part of the present invention for causing continuous revolution of the main shaft.

FIG. 30 illustrates the slide 166 which in the second fifth of a revolution of the control shaft 125 is pressed by the cam 167 to the left and, on the one hand, engages a pin of bar 117 and acting through the intermediary of lever 116 turns the shaft 114 in anti-clockwise direction to prevent the repeating accumulator during multiplication or division from being brought to operative position, unless the repeating accumulator has been put out of operation by the accumulator key. On the other hand, the spring 168 is tensioned whereby the slide bar 169 is permitted to move to the left at the appropriate time to disable the printing mechanism during multiplication and division and to prevent the setting mechanism from being returned to the right by means not shown in the drawings, as they do not form part of the present invention.

FIG. 31 illustrates the mechanism which is instrumental in causing the results to be automatically transferred to the repeating accumulator during multiplications and divisions.

For this purpose, the slide 158 (FIGS. 18 and 31) is movably mounted on the shaft 171. The cam 172 (FIGS. 17 and 31) may be moved to the left by means of this slide 158 and will be arrested in either one of its two positions by a detent spring not shown. The cam 172 has a groove engaged by a key 175 inserted in the control shaft. By means of this key the cam is connected with the control shaft for common rotation. In FIGS. 17 and 31 the cam is shown in inactive position. When in active position the cam 172 acts on the slide 173 (in the fourth fifth) and this slide is pivoted to the lever 174 in the point 170, the lever 174 being secured to the shaft 114 (see also FIG. 1). When the accumulator axis is in actuated position, it has swung the lever 113 to the left through the intermediary of slide 111 and spring 115, whereby the automatic repeating accumulating mechanism has been disabled. The cam 172 swings the shaft 114 back in clockwise direction causing the result when cleared to be now transferred into the repeating accumulator, irrespective of whether the control shaft 125 has been shifted to the right or to the left for multiplication or division.

The cam 176 may be shifted from its "zero position" (FIGS. 17, 18 and 25) to the right or to the left by a slide 159 to cause the result of a multiplication or division to be added or subtracted in the accumulator II (75) during the fourth phase. The cam 176 (FIG. 17) has three noses. The noses 178 act on the slide 179′ during plus and minus and the nose 180 acts on the slide 181 during minus.

The slide 179′ serves the purpose of engaging the accumulator II with the computing racks during the forward stroke (FIG. 16; 179′, 182′, 183′, 184, 185, 186, 187) by rocking the accumulator about the pivot 188′. In the minus position the cam 176 acts on the slide 179′ and upon the slide 181. The slide 181 moves the linkage for the minus operation into effective position, such linkage being not shown herein as it does not form part of the present invention.

FIG. 35 illustrates the means for rendering the clearance rack 218 for the multiplication-division unit effective, such rack operating the clearing shaft 219 which is connected with a pinion 220 having nine teeth. The clearing shaft is similar to that disclosed in the German Patent No. 727,923 and serves the purpose of resetting the multiplication-division unit 157 to "zero." The clearing rack has slots 218′ for longitudinal guidance on the shafts 23 and 25, whereas a pawl 221 is pivotally mounted on the collecting shaft 23 for cooperation with the square stud 222 riveted to the clearing rack 218. A weak leaf spring 223 tends to turn the pawl 221 in anti-clockwise direction, while the right hand arm of the pawl braces itself against the lever 224 which is kept in the position shown by the powerful spring 227. The lever 224 is fulcrumed on the shaft 226, and the cam 225 lifts the lever in the fourth phase so that the spring 223 becomes effective and places the pawl 221 in front of the square stud 222. Upon movement to the left, the clearing rack 218 is positively carried along to the left and rotates the clearing shaft 219 through one complete revolution. On return of the elements, the multiplication-division unit is disengaged and the clearing rack 218 is positively restored to its initial position by the collecting shaft.

FIGS. 36 to 39 illustrate the plus-minus actuation of the accumulator I during division. In a division operation it is necessary to subtract the divisor repeatedly until the remaining amount is reduced below "zero." Thereafter an addition revolution must be carried out whereupon the setting mechanism in which the divisor is set up is moved one denomination to the right. Then the repeated subtraction is carried out again etc.

The reduction of the remaining amount below zero causes a ten-carrying operation throughout the accumulator I, and this ten-carrying operation produces an actuation of shaft 228 (see also FIG. 1) which thereby is brought from the position shown in FIG. 36 to the position shown in FIG. 37. The resting position is shown in FIG. 36, whereas FIG. 37 illustrates the actuated position of the arm 230 which is active with respect to the lever.

In this operation, the cam 231 depresses the actuating arm 230 and this arm, in its turn, acts on the stud 232 which is riveted to the minus slide 197 of the accumulator I. As a result, the minus slide has also moved to the left and has initiated the subtracting operation with respect to the accumulator I. When owing to the reduction below zero the shaft is moved, as shown in FIG. 38, the actuating arm 230 is pulled down and at its upper inclined face 230′ slips off the cam 231 so that the slide 197 may return to its initial position permitting an additive cycle to be performed. Before the following subtracting revolution occurs the shaft 228 is turned again in clockwise direction, and the actuating rod is lifted, the cam 231 and the inclined face 230′ being operative again to shift the minus slide 197 to active position shown in FIG. 37.

FIG. 39 illustrates the setting lever 233 and the cam 234 which are operative through the intermediary of a rod 235 to cause the division mechanism to become effective during division in the phases 3 and 4 by the division key to be disabled again when the division has been completed. The means employed for this purpose are not shown herein as they do not form part of the present invention.

For the automatic printing of the decimal mark in a division operation the automatic division tabulator is of importance. This tabulator renders it possible to place the highest denomination of the divisor below the highest denomination of the dividend. The shaft 58 is connected with the setting mechanism (FIGS. 1, 2 and 40) through the intermediary of the arm 63. An angular member 236 is riveted to the shaft 58. The abutment member 240 abuts against the member 236 under the effect of a weak spring 241 pulling the abutment member 240 to the right in FIG. 40. The abutment member 240 is easily movable on the shaft 239 lengthwise thereof, but is secured against relative rotation to the shaft 239 by a nose engaging a groove of the shaft. When the amount 62500 is set up, the angle member 236 has moved the abutment member 240 five denominations to the left. Thereupon the division key 130 (FIGS. 40 and 41) is depressed whereby the amount 62500 is transferred into the accumulator from the setting mechanism 47 (FIG. 1). The control required for that purpose is effected by the control shaft 125.

At the same time, the division key 130 (FIG. 40) has moved the rod 243 to the left through the intermediary of the stud 134. The rod 243 is pivotally connected to an arm 242 secured to the shaft 239. By this arm the shaft 239 has been turned in clockwise direction so that the rear edge of the abutment member 240 has entered a slot 245 provided in the stationary frame of the machine without causing disengagement of the abutment member 240 from the angular member 236.

After the amount 62500 has been transferred into the accumulator in a manner that need not be described in detail as it does not form part of the present invention, the setting mechanism is likewise cleared and restored to its right hand initial position by means of the parts 247, 248, 250, 251 and 253. The abutment member, however, being still in engagement with one of the slots 245 cannot follow its spring 241 and, therefore, will remain in position. The division key 130 returns into its upper position after this cycle of operation. However, a latch 246 which has engaged a tooth gap 243′ prevents the rod 243 from returning to its starting position whereby the abutment member 240 will remain in engagement with the slot 245.

In the example chosen the amount 62500 shall be divided by 25. Now the divisor 25 is set up in the setting mechanism. At first the amounts would stand one below the other in a numerical manner as follows:

62500
25

Prior to the performance of the division, however, the numbers must stand as follows:

62500
25000 which is carried out automatically in the following manner: The division key 130 is depressed again. Thereby the escapement lever 60 (FIG. 40) secured to the shaft 255 is swung in clockwise direction as will be explained hereinafter and releases the teeth of the escapement rack 59 so that the setting mechanism moves to the left drawn by the spring 57 until the angular member 236 contacts the abutment member 240. As a result, the digit 2 of the divisor 25 will stand in the same denomination as the digit 6 of the dividend 62500.

Moreover, it will be shown how the above mentioned escapement lever 60 is actuated, such actuation not occurring until the division key 130 is depressed the second time, and it will be shown how all of the elements described will be restored to their starting positions.

Figure 44:
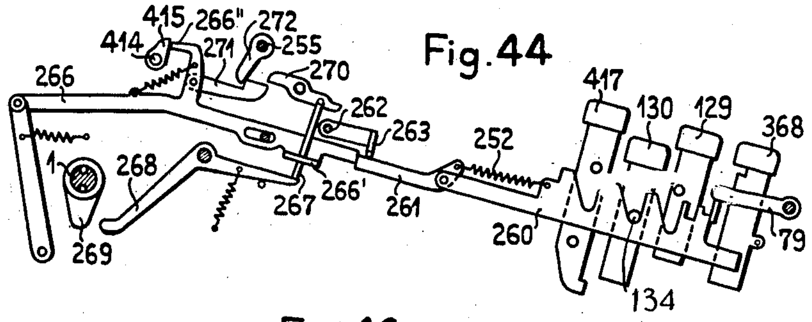

The stud 134 of the division key 130 moves the bar 260 (FIGS. 41, 44) to the left. Upon the first depression of the key, however, this movement remains without effect (FIG. 43) because a lever 263 has a bent lip keeping the push dog 261 contrary to the tendency of its spring 252 in a position in which the dog passes without any effect beneath the rod 266 initiating the division operation. The position of the lever 263 is controlled by a cam slot 161′ (FIG. 42) of the slide 161, the lever having a lip extending into said slot. The slide 161 is moved forwardly in two steps by the control shaft 125 and by the cam 162. After the first fifth of the revolution of the control shaft performing one revolution in five steps, the slide pivotally connected to the left end of the bell crank 264 will be moved by the shoulder 162′ of the cam 162 such a distance that the bell crank 264 will arrive in the position 264′ and, therefore, will not be able as yet to cause continuous cycling of the machine, as the bell crank 264 will be brought into the continuous-cycling position on the second step only of the control shaft, as is required for multiplication and division operations. In this position, however, the pin of the lever 263 engaging the cam slot 161′ will have arrived on the highest point so that the lever 263 assumes the position shown in FIG. 44 and the push dog 261 is in operative position in front of the rod 266, this rod being urged rearwardly by the division key 130 when the same is depressed the second time. In the course of this movement the pawl 271 pivotally connected to the rod 266 engages the lever 272 (FIGS. 40 and 44) and, as above described, the shaft 255 is swung and the escapement lever 60 is disengaged from the escapement rack. This escapement lever 60, however, must be able again during the performance of division to follow its spring 257 and must be disengaged from the pawl 271 by which it had been held out of engagement. At the same time, the pawl 246 will be disengaged as soon as division is effected so that the rod 243 may return to its resting position, when the division key 130 upon completion of the division rises. The stop pawl 270 is fulcrumed on a stationary pin and is pivotally connected with a push rod 267. This push rod is guided in a bore of a bent lip 266′ of the rod 266 (FIGS. 43 and 44). A bell crank 268 cooperating with a cam 269 secured to the main shaft 1 of the machine may lift the push rod 267, provided that this push rod has been moved to the left by the rod 266 into engagement with the bell crank 268. The stop pawl 270 is thereby swung in counterclockwise direction and its left arm depresses the pawl 271 so that the lever 272 is released. The right hand arm of the stop pawl swings the pawl 246 in clockwise direction, whereby the rod 243 (FIG. 40) is released and the spring 244 pulls the rod back into the initial position. Thereby the shaft 239 will be turned through the intermediary of arm 242 and the abutment member 240 will be brought out of engagement with the slots 245 whereby the spring 241 will become effective and will return the abutment member into contact with the angular member 236.

For a better understanding of multiplication and division the multiplication-division unit 157 will be described in detail with reference to FIGS. 27 and 45–50.

On the clearing shaft 212 of a known type as many pinions 400 as computing racks 26 are provided, are freely rotatably mounted and are resiliently detained in position by a detent slide 401 engaging the tooth gaps. By means of three spacer bolts 402 an annular member 403 is riveted to each pinion 400, such annular member having a gap. This annular member 403 during multiplication serves the purpose of determining the number of the multiplying cycles and the denominational indexing operation. This annular member cooperates with a sensing finger 410 and with a sensing wing 412, both of which are mounted on the sensing shaft 411, the sensing finger 410 being axially movable but secured against relative rotation, whereas the wing 412 is firmly secured to the shaft 411. This shaft is rotatably mounted in and extends between the walls 5 and 6. The sensing finger 410 will resiliently engage the annular member as long as a numerical amount is set up, whereas the finger may engage the gap when the pinion is set to its zero position. When the finger engages the periphery of the annular member, the prongs 412′ of the sensing wing are spaced a certain distance therefrom. The sensing wing 412 has as many prongs as there are pinions 400 and annular members are provided corresponding to the number of denominations. On another accumulator shaft 404 a counting member 405 is slidably but non-rotatably mounted, such member having a pair of arms carrying the counter-pawls 406 and 407 which are held in the position shown by a spring.

A numerical amount introduced into the pinions 400 in clockwise direction will be cleared tooth by tooth by the counting pawl 406 when the counting shaft 404 is likewise turned in clockwise direction, one tooth being restored per revolution of the main shaft of the machine. In this operation prior to any resetting operation the sensing finger senses the annular member connected with the pinion and as soon as a gap is sensed, the finger will enter such gap and in a manner which need not be described as it does not form part of the present invention, the resetting will be discontinued and a denominational indexing movement of the setting mechanism into the following denomination will occur, provided that in the higher denomination there will be set up a digit of the multiplier. This is due to the fact that one or a plurality of the prongs 412′ will contact one or more of the annular members assuming angular positions corresponding to the digits set up permitting the sensing finger to enter the gap only to half its depth. As soon, however, as all of the pinions have been zeroized after the required number of cycles of the machine, the sensing wing too may enter the gaps. This will terminate the multiplying revolutions of the main shaft of the machine.

When the setting mechanism jumps to the left into the higher denominations, the sensing finger and also the counting member must partake in this movement. To this purpose, the yoke 29 of the setting mechanism is provided with tooth gaps 29′ (FIG. 49), the number of which corresponds to the number of denominational units of the machine (FIGS. 41, 44, 48, 49 and 50). When the multiplicand has been set up in the setting mechanism (the multiplier has been entered in the multiplication-division unit 157 already), the multiplication key 129 is depressed the second time and the rod 266 is pressed to the left (FIG. 44) through the intermediary of slide 260 and pawl 261. In this operation the finger 261″ swings the lever 415 in anti-clockwise direction and the shaft carrying the lever 415 swings a bar 413 which engages a recess of the clutch lever 408 and, therefore, imparts a swinging movement in clockwise direction to the same causing the lower edge of the lever 408 to engage the tooth gap 29′ of the setting mechanism 29, whereas the upper edge of the lever 408 disengages the pawl 416. (The latter keeps the connecting lever in its lateral basic position.) The clutch lever 408 is freely rotatably mounted on the counting member 405. On the same member there is likewise freely rotatably mounted the actuating member 409 which has a recess slidably engaging a guide rod (FIG. 46), the left arm of the member 409 engaging a slot of the sensing finger 410. Therefore, at this point of the operation counting pawls 406, 407 and the sensing finger 410 are connected with the setting mechanism to partake in the denominational steps thereof.

During division the operation is similar, except that the sensing finger 410 and the sensing wing 412 are inactive and remain in their positions shown.

In the manner described the dividend is introduced into the accumulator by depression of the division key 130. The divisor is set up in the setting mechanism and the division key is again depressed. The rod 266 will be moved to the left by slide 260 and pawl 261. In this operation too the lever 415 will be swung and the counting member 405 will be connected with the setting mechanism 29 through the intermediary of parts 414, 413 and 408. Following this operation, as described with reference to the division tabulator, the setting unit will be released by the escapement lever 60 (FIG. 40) and will be pulled to the left until it engages the part 240. When this position has been reached, the counting pawls 406, 407 are placed above the coordinated pinion which is in the same denominational position as the number last set up in the setting mechanism.

Now considering the above problem: 62500:25=the result would be reproduced by the printing mechanism in the following way as the problem involves undivided figures:

62500 + dividend
25000 + devisor
2500 = result

Hence, it will appear that the decimal mark in the result has the same denominational position as the decimal mark in the dividend.

According to the invention, a comma key 417 (FIGS. 41 and 44) has been provided which acts in the following manner: Without a comma mark being printed at first by the printing unit the comma key causes the result to so appear in its position that it always stands in proper denominational relationship below the dividend. Even should the machine not be equipped with a comma-printing mechanism, the decimal mark may be immediately determined. This is a particular advantage. The above problem will now be repeated with amounts having modified denominational values, but the same digits:

6250.0÷2.5=2500.0

The operations required for setting up the dividend 62500 on the number keys, includes depressing the division key 130, setting up "2", by depressing the number key and depressing the comma key 417 (as shown in FIGS. 48, 49, 50, 41 and 44) so that the counting member 405 will be connected with the setting mechanism by the parts 417, 260, 261, 266, 415, 414, 413, 408), whereupon the digit "5" is set up, by depressing the corresponding number key and then the division key 130 is depressed a second time.

62500
25 is the position before depression of division key. At first the setting mechanism will jump to the abutment member 240.

Position prior to commencement of the division:

62500 + (value in the accumulator)
25000 + (value in the setting mech.)
6250 0 +
2500 0 :
2500 0 = (numerical values reproduced by the printing mechanism paper strip)

For the automatic comma-printing operation it is only necessary to print the comma in the proper denominational position in the dividend and in the divisor in such a manner that the same comma key is struck at the proper time in the dividend as well as in the divisor, that is to say exactly as though the number would be typed on a typewriting machine. In order to cause the comma to automatically appear in the result at the proper position, it is only necessary, therefore, to cause the machine to repeat the same comma position as before in the dividend.

The counting member 405 is capable of being swung during division by suitable means from the central position shown at any cycle of the machine to the left or to the right to count the subtracting cycles and to reset the excessive amount counted again in a known manner after the passage through zero by means of an adding cycle. The clearing shaft 212 of a known type put in operation by the control shaft as above described will clear the quotient from the multiplication-division unit. The cleared amount may be printed by the printing unit in this operation.

The following mechanism is provided for the automatic printing of the decimal mark in all factors as well as results during additions, subtractions, multiplications and divisions:

A gear 319 is secured to the control shaft 318 (FIGS. 9 and 10) and meshes with a toothed sector 320 mounted on the wall 4 of the frame. A tension spring 323 pulls the toothed sector in anti-clockwise direction, the roller 321 of the toothed sector being braced against the highest point of a cam disk 322, provided that the main driving shaft 1 is in its resting position as shown. On the control shaft 318 there is mounted and secured the actuating member 324 which engages the bushing 325 of the stepped disk 326. The stepped disk may be laterally moved, but it is not rotatable. A compression spring 327 maintains the stepped disk in the position I and is braced against the bell crank 328 which is fulcrumed to the stationary machine frame at the point 329 and, if actuated by the push rod 330, may move the stepped disk 326 to the position II. The steps are so arranged along a spiral (FIG. 12) that where the accumulator and the setting mechanism have seventeen denominations, seventeen steps are provided. These steps cooperate with bent lips 331′ and 332′ (FIG. 11) of the setting levers 331 and 332 in such a manner that in the position I the stepped disk 326 cooperates with the setting lever 331 and in the position II cooperates with the setting lever 332.

A cable 360 (FIGS. 11, 12 and 14) is fixed to the rod 58 (FIGS. 14 and 40) which is connected with the setting mechanism by the connecting bracket 63. This cable extends around the guide rollers 334 and around the roller 358 to the stationary point 359. The roller 358 is mounted on a two-armed lever 337 which is fulcrumed in the bores 337′. A weak spring 338 tends to turn this two-armed lever 337 in anti-clockwise direction. The spring 57 which pulls the setting mechanism to the left is more powerful than the spring 338 so that when the setting mechanism performs a movement to the left or to the right, the two-armed lever 337 may follow such movement, the cable 360 and the reversing roller 358 being operative to impart a travel through half the distance of the setting mechanism to the upper end of the lever. The pawls 339 and 340 are pivotally connected to the two-armed lever 337 (FIG. 14) at the points 337″ and 337‴, springs 341 and 342 tending to turn the pawls in anti-clockwise direction. Arms 339′ and 340′ of the pawls are braced against bell cranks 343 and 344, the bell crank 343 being coordinated to the pawl 339 and the bell crank 344 being coordinated to the pawl 340. The rod 345 is connected with the bell crank 343 through a longitudinal slot 345′ and a spring 348. The right hand end of the rod 345 (FIG. 15) is pivotally connected to the bell crank 346 which is connected with the stem 347 of the comma key 417.

The actuating levers 331 and 332 (FIGS. 12, 14, 14a) are fulcrumed on a stationary stud 353 fixed to the frame of the machine and springs 354 and 355 tend to turn the levers in anti-clockwise direction, the levers engaging bent lips of the pawls 356 and 357 which are pivotally mounted on a stationary shaft 364 for free rotation. The actuating levers 331 and 332 have ratchet teeth, the upper teeth cooperating with the pawls 339 and 340 and the lower teeth cooperating with the pawls 356 and 357. The number of the teeth corresponds to the number of denominations of the accumulator and of the setting mechanism and of the steps of the stepped disk 326. The actuating lever 331 carries a reversing roller 335 and a cable or cord 333 extends from a stationary point 336 around the roller 335 and a roller 361 to the comma indicator 362 which is subjected to the force of a tension spring 363 which keeps the cable 360 taut. The pawl 356 when in resting position is out of engagement with the associated ratchet teeth and is connected with the connecting rod 365 (FIG. 15) and the bell crank 366 and with the stem 367 of the arresting key 368. The bell crank 366 is connected with the rod 345 by a link 383 so that when the arresting key 368 is depressed the cam slot lever 346 can no longer act on the rod 345. The cam 420 (FIGS. 13 and 17) of the control shaft 125 cooperates with the two-armed lever 369 which by means of the rod 330 may act on the bell crank 328 (FIG. 10) to thereby move the stepped disk 326 contrary to the tendency of its compression spring 327 into the position II.

*Comma Setting and Comma Printing During Addition, Subtraction, Total Taking and Running Total Taking*

Example:

29.50
+21.75
51.25

(1) Setting up 2 and 9 by the number keyboard,
(2) Depressing the comma key 417,
(3) Setting up 5 and 0 (in the window of the housing there appears the indication shown in FIG. 18 including the comma)
(4) Depressing the arresting key 368 and locking same,
(5) Depressing the plus key,
(6) Setting up the digits 2175 (without depression of the comma key,
(7) Depressing the plus key,
(8) Depressing the total key. All of the numerical amounts will appear on the paper strip with the decimal mark as above represented.

In the course of all of the following additions, subtractions, total-taking operations and running total-taking operations the comma key is no longer actuated, as long as the arresting key remains in depressed condition.

The operation of the machine is as follows:

After the digits 2, 9 have been set up the setting mechanism 29 (FIGS. 1, 2, 11, 12, 14 and 15) and the shaft 58 have jumped two denominations to the left, the mechanism 29 being operatively connected to the shaft by the fork-like lever end of part 63 secured to said shaft, FIGURES 4 and 40. Two marking points 371 appear in the window 373 of the housing, whereas the decimal mark 362 is not visible as yet. By actuation of the comma key 417 which is locked in its depressed position by the pawl 374, the bell crank 343 is rocked in clockwise direction through the intermediary of the cam slot lever 346, the rod 345 and the spring 348, the pawl 339 being caused by the spring 341 to engage the teeth of the setting lever 331. Thereby the two-armed lever 337 which because of the displacement of the shaft 58 through two denominations has moved through a corresponding angle, is coupled with the setting lever 331, the shaft 58 being operatively connected to lever 337 by the cable 360.

When the digits 5 and 0 are set up, the shaft 58 acting via the cable 360 pulls the two-armed lever 337 along contrary to the tendency of spring 338, and acting via pawl 339 moves the setting lever 331.

By the depression of the comma key 417 (FIGS. 14, 14*a* and 15) the stud 385 riveted in the rod 345 is moved to the left, the bell crank 344 under the effect of its spring 386 is turned in clockwise direction and the pawl 340 is permitted to be moved by its spring 342 to engage the upper teeth of the setting lever 332 so that the later is swung hrough two denominations (when the digits 5 and 0 are set up). At this time only the election of the function key is necessary. Since the plus key is to be actuated and since further additions are to be performed with the same position of the decimal mark, first the arresting key 368 (FIG. 15) is depressed and is locked in a known manner by upward displacement into a recess 367′ of the key stem 367. Thereby the bell crank 366 is swung in anti-clockwise direction and the rod 365 is pulled to the right and the pawl 356 is turned in counter-clockwise direction causing its bent lip to engage the lower teeth of the setting lever 331 so hat the spring 354 is no longer effecive. At the same time, the rod 345 is swung downwardly by the link 388 (FIG. 15) so that it is disengaged from the cam slot lever 346 and is permitted to move under the action of the spring 387 thereby restoring the bell crank 343 in anti-clockwise direction and swinging the pawl 339 (FIG. 14) upwardly out of engagement with the setting lever 331. As a result, this setting lever 331 will remain stationary in the following computing operations. Also the comma indicator 362 appearing in the window of the housing, FIG. 18, remains in the position illustrated.

Multiplications or divisions may also be carried out in the depressed condition of the arresting key. The printing of the decimal mark, however, is always effected at the same position.

The printing of the decimal mark in the second denominational position is effected in the following manner:

Referring particularly to FIGS. 9–15, the bent lip 331′ of the setting lever 331 is in a position swung to the right by two denominations from the position illustrated. During the revolution of the main driving shaft 1 the lever 320 is rocked counter clockwise (FIG. 9) of the spring 323 under the control by the cam 322 engaged by the follower roller 321 and causing the toothed segment meshing with the gear 319 to turn the control shaft 318 in clockwise direction until the second step of the disk 326 engages the bent lip 331′ of the setting lever 331. Owing to this operation, a recess 318′ (FIG. 6) is brought into registry with the comma-printing lever 317 of the second denominational unit. Therefore, when the number 29.50 is printed, the decimal mark is printed at the same time at the proper denominational position. This operation is repeated at any desired numerical amount as long as the arresting key retains the setting lever 331 in the same position. When the arresting key is unlocked and returns to its upper resting position, the pawl 356 (FIGS. 14*a*, 15) is swung out of engagement with the associated teeth and the setting lever is restored by its spring 354 in to its resting position shown, the comma mark 362 disappearing at the same time from the window of the housing.

The printing of the decimal mark for the individual factors and for the result will now be explained with reference to an example of multiplication, such example comprising 2.5×270.05=675.125.

*Manipulation of the Machine*

(1) Setting up "2"
(2) Depressing the comma key
(3) Setting up "5"
(4) Depressing the multiplication key (the multiplier is depressed and transferred into the multiplication-division-unit)
(5) Setting up 2, 7, 0
(6) Depressing the comma key
(7) Setting up 0, 5
(8) Again depressing the multiplication key (the multiplicand is depressed; machine multiplies and the result is printed)

On the paper slip there appear the amounts arranged as follows:

2.5 ×
270.05 ×
605.125=

*Operations of the Machine*

(1) When the "2" is set up, the two-armed lever 337 is moved one step by the shaft 58 (FIGS. 12, 14) moving in the direction of arrow 390 and by the cable 360.

(2) The comma key 417 is depressed and is locked by the latch 374. By the cam slot lever 346, the rod 345 and the spring 348 the bell crank 343 is turned and the pawl 339 (FIG. 15) is engaged with the upper teeth. Similarly, the bell crank 344 is turned by the stud 385 and the spring 386 and engages the pawl 340.

(3) The digit 5 is set up causing the setting mechanism to jump one denomination to the left. As a result, the setting levers 331 and 332 are turned one step through the intermediary of shaft 58, cable 360, two-armed lever 337, and pawls 339 and 340.

(4) The multiplication key 129 is depressed, as a result, the machine performs one cycle (see the explanation of the multiplication with reference to the control shaft). In this cycle the multiplier 2.5 is transferred into the multiplication-division unit 157. By the parts 322, 321, 320, 323 and 319 (FIGS. 9, 10, 11 and 12) the control shaft 318 and the stepped disk 326 fixed thereto are turned until the first step of the step disk engages the bent lip 331′ of the setting lever 331. Then the amount 2.5 is printed on the paper slip and the setting unit is restored to "0" and is returned to its lateral initial position. In this operation the control shaft 125 (FIG. 15) has turned one fifth of a revolution in clockwise direction and has caused the cam 352′ of the hub 352 to swing the lever 351 pulling rod 350 to the right and turning the latch 357 by spring 389 in counterclockwise direction so that its bent lip engages the lower teeth of the setting lever 332 preventing same from being restored by the spring 355. By action of the elements 376, 377 and 374 the comma key is released again and the parts 346, 345, 343 and 344, 339 and 340, 331 return to their normal positions. Therefore, the setting lever 332 will remain in the position corresponding to the factor 2.5 (with one denomination after the decimal mark).

(5) The digits 2, 7, 0 are set up. As above described, the shaft 58 has moved the cable 360, the two-armed lever 337 and the pawls 339 and 340 only three steps.

(6) The comma key is depressed. As a result, the pawls 339 and 340 engage the setting levers 331 and 332 being actuated by the parts 346, 345, 348, 343, 385 and 344.

(7) The digits 0, 5 are set up. The setting mechanism moves two denominations to the left. By the cable 360, the two-armed lever 337 and the pawls 339 and 340 the setting levers 331 and 332 are displaced two steps. In a similar manner, the comma indicator 362 is moved by the cable 333 so that the number is exhibited in the window 373 of the housing with the proper decimal subdivision. At this time, the setting lever 332 is displaced three steps from normal and forms the total of the two denominations after the comma of the factor 2.5 and the factor 260.05.

The resilient latch 357 arrests the setting lever 332 in this position for the time being.

(8) The multiplication key 129 is again depressed. Now a sequence of machine cycles follows. In the first cycle the amount 270.05 is printed in the following manner: The setting mechanism transfers the value into the racks 26. By the parts 322, 321, 320, 323 and 319 (FIGS. 9, 10, 11 and 12) the control shaft 318 with the stepped disk 326 is turned until the third step engages the bent lip 331′ of the setting lever 331. Then the printing on the paper is effected and thereafter the setting mechanism receives the amount again (for the purpose of further multiplication). Thereafter the multiplication is carried out, five revolutions being made in the basic position, and two further revolutions being performed after the setting mechanism has jumped one denomination to the left.

As above described when the multiplication has been completed the control shaft is turned to its third phase position, the setting mechanism being brought to its zero position and returned to its lateral starting position. At the same time, the cam 420 secured to the control shaft 125 is rendered effective to turn the bell crank 328 in counterclockwise direction by means of the lever 369 and the rod 330 (FIGS. 13 and 10). In this operation the stepped disk 326 is moved from the position I to the position II against the action of the spring 327.

Thereafter the control shaft 125 is turned to its fourth phase position. The result stored in the accumulator is printed and the accumulator is cleared. During this cycle of the operation the parts 322, 321, 320, 323 and 319 (FIGS. 9, 10, 11, 12, 14 and 15) are rendered effective to turn the control shaft 318 and the stepped disk 326 mounted thereon in clockwise direction until the stepped disk engages the bent lip 332′ of the setting lever 332 as above described, the setting lever being in its third step position. Consequently, the result 675.125 is automatically printed with the decimal mark properly positioned. Thereafter the control shaft 125 is turned another fifth of a revolution into its zero position, the cam 420 permitting its lever 369 and the parts 330, 328, 326 and 318 to likewise return to the initial position shown. Moreover, the cam 352 permits its lever 351 to return into the starting position, and the latch 357 is restored by the rod 350 so that the spring 355 is rendered effective to pull the setting lever 332 back to its starting position.

*Divisions*

Example: 675.125:2.5=270.05

*Manipulation of the Machine*

(1) Digits 6, 7, 5 are set up
(2) The comma key is depressed
(3) The digits 125 are set up
(4) The division key is depressed
(5) The digit 2 is set up
(6) The comma key is depressed
(7) The digit 5 is set up
(8) The division key is depressed again On the paper the amounts will appear as follows:

6 7 5. 1 2 5 :
2. 5 0 0 0 0 :

*Operations of the Machine*

(1) When the digits 6, 7, 5 are set up, the two-armed lever 337 is displaced three steps by the shaft 58 (FIGS. 12, 14) acting in the direction of arrow 390 and by cable 360.

(2) The comma key 417 is depressed and is locked by the latch 374. The bell crank 343 is rocked by the cam slot lever 346 and the rod 435 moving to the left and by spring 348, and the pawl 339 is engaged with the uper teeth (FIG. 15). Similarly, the bell crank 344 is rocked by the stud 385 and the spring 386, and the pawl 340 is engaged.

(3) The digits 1, 2, 5 are set up. This operation causes the setting mechanism to jump three denominations to the left whereby shaft 58, cable 360, two-armed lever 337 and the pawls 339 and 340 will rock the setting levers 331 and 332 three steps. In the window of the housing six denominational marks 371 and the decimal mark at the proper position have been exhibited under the control of the setting lever 331 and the cable 333.

(4) The division key is depressed. The machine performs one cycle (see the explanation of the division operation explained with reference to the control shaft). As a result, the dividend 675.125 is transferred into the accumulator and the parts 322, 321, 323 and 319 and 320 (FIGS 9, 10, 11 and 12) turn the control shaft 318 and the stepped disk 326 until the third step of the latter engages the bent lip 331′ of the setting lever 331. The division key acting through the part 343 (FIG. 15), as described with reference to the division tabulator, actuates the parts 242 and 239 (FIG. 40) and the abutment member 240 is moved to the sixth denominational position.

Then the dividend is printed on the paper strip and the setting mechanism is restored to zero and is returned laterally to its starting position. In this operation, the control shaft 125 has turned one fifth in clockwise direction having thus returned to its first phase position. In so doing, the control shaft acting through the cam 352 (the control shaft 125 has been moved to the left (FIG. 17) by the division key permitting its larger cam 352″ (FIG. 15) to act on the lever 351, whereas during multiplication the smaller cam 352′ was operative) has so displaced lever 351 and rod 350 that this rod has now arrived in the position 350″ (as distinguished from the multiplication operation). As a result, the bell crank 357 through the action of its spring 389 is engaged with the lower teeth of the setting lever 332. At the same time, the spring-controlled latch 391 is resiliently engaged with the arm 344′ of the lever 344, such arm having been swung in clockwise direction for the time being. When the restoration of the comma key is effected by the parts 367, 377 and 374 and when the parts 346, 345 and 343, 385 and 344 return to their resting positions, the latch 391 will be positioned across the arm 344′ of the lever 344 so that the lever 344 cannot be rocked again, since it is locked by the latch 391 and the rod 350. The setting lever 332 has been locked in its position by the pawl 357 as in multiplication operations, such position corresponding to the same position of the decimal mark of the dividend. As described with reference to the multiplication, the parts 343, 339 and the setting lever 331 return to their normal positions. The same applies to the decimal mark 362.

(5) The digit 2 is set up. As above described, the shaft 58, the cable 360, the two-armed lever 337 and the pawls 339 and 340 are moved one step.

(6) The comma key 417 is depressed. As above described, the bell crank 343 is actuated by the parts 346, 345 and spring 348, and the pawl 339 is engaged with the setting lever 331, whereas the bell crank 344 is unable to follow the stud 385 and the spring 386, since the latch 391 is disposed closely above the arm 344′ of the bell crank 344. Therefore, the pawl 340 cannot engage the upper teeth of the setting lever 332.

(7) The digit 5 is set up. The setting mechanism, the two-armed lever and the pawl 339 and the setting lever 331 are moved one step. In the window of the housing two denominational marks and the decimal mark are now exhibited corresponding to the numerical amount 2.5. The setting lever 332 has not been moved, since, as above stated, the pawl 340 is prevented from engagement.

(8) The division key is depressed anew.

I. By parts 260 and 261 the part 266 is moved to the left and the machine is set to division (FIGS. 44, 40, 48 and 50).

II. Part 266″ is actuated by parts 415, 414 and 409.

The counting lever 405 is connected with the setting mechanism 29.

III. The carriage escapement is released by the parts 272, 255 and 60 (FIG. 40) and the setting mechanism 29 and the counting member 405 move. Under the effect of the spring 57 and through the intermediary of the cable 360 the parts 337 and 339 and the setting member 331 move until the angular member 236 (FIG. 40) arrives in contact with the abutment member 240. As a result, the digit 2 of the divisor is positioned below the digit 6 of the dividend, coupled with the setting lever 331 indicating the decimal subdivision of the divisor. Now the divisor is printed together with the decimal mark at the proper denominational position, the control shaft 125 being turned to its second phase position. Then the division operation follows, the revolutions of the main shaft occurring in the different denominational positions being recorded by the multiplication-division unit and the setting mechanism being progressively moved to the right accordingly.

Upon completion of the division the control shaft is turned to its third phase position causing a clearing operation to be performed to thereby clear any rest that may have been left in the accumulator and to print such rest. At the same time, the cam 420 acting through lever 369, rod 330, bell crank 329 (FIGS. 10 and 13) has moved the stepped disk 326 to the position II. Following this operation the control shaft is turned to its fourth phase position. During this cycle of operation the multiplication-division unit is cleared, the quotient computed being printed. The parts 322, 321, 320, 323 and 319 (FIGS. 9, 10, 11 and 12) become effective again and the control shaft 318 with the stepped disk 326 is turned until its third step acts as a stop for the bent lip 332' of the setting lever 332 so that the result 270.050 with the decimal mark at the proper denominational position is printed.

In the fifth phase the setting mechanism is cleared and is returned laterally to its starting position. Moreover, the parts controlled by the cams 420 and 352 are restored, as described heretofore with reference to the multiplication operation.

While the invention has been described in connection with a preferred embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

What we claim is:

1. In a calculating machine, a casing having a keyboard provided with a set of ten numeral keys, a window in the top wall of said casing adjacent said numeral keys, said calculating machine including at least one accumulator, a multiplier quotient unit, and a printing mechanism for printing a decimal mark and means for printing a value set up in said accumulator at a variable denominational position, said calculating machine also including an ordinally shiftable setting mechanism operably connected to the accumulator, and a control carriage shiftable in unison with the setting mechanism, a digit position indicator secured to said control carriage in a position to move beneath said window to visibly indicate successive digit positions of said setting mechanism, a decimal point indicator movable along said digit position indicator beneath said window upon entry of each decimal digit, a pair of setting levers pivotally mounted in the machine adapted to control said decimal printing mechanism and said decimal indicator, first means connecting one of said setting levers with said digit position indicator so that stepwise shifting of said digit position indicator causes stepwise pivotal movement of said one setting lever, second means connecting the other setting lever with said decimal point indicator and said decimal printing mechanism so that stepwise shifting of said decimal point indicator coincides with stepwise pivotal movement of said other setting lever, and means selectively operable to connect said two setting levers so that subsequent movement of the former moves the latter.

2. The calculating machine as set forth in claim 1, in which said first and second means comprise cables, and guide rollers rotatably mounted in the machine over which said cables are trained.

3. The calculating machine as set forth in claim 1, including latch means for holding said decimal point key in a retracted position, said decimal mark mechanism comprising a decimal point printing member for each order, each in a normally retracted position, a cam shaft adapted to be shifted under control of said decimal point key to operate a decimal point printing member, a counting element, and linkage means connecting said counting element with said setting mechanism upon depression of said decimal point key during entry of a divisor so that a quotient subsequently introduced into the multiplication division unit by said counting unit will assume the same denominational position as the dividend previously entered in the machine.

References Cited in the file of this patent

UNITED STATES PATENTS

| | | |
|---|---|---|
| 2,329,190 | Ellerbeck | Sept. 14, 1943 |
| 2,467,419 | Avery | Apr. 19, 1949 |
| 2,675,960 | Frieberg et al. | Apr. 20, 1954 |
| 2,702,159 | Reppert | Feb. 15, 1955 |
| 2,917,232 | Wagemann | Dec. 15, 1959 |

FOREIGN PATENTS

| | | |
|---|---|---|
| 1,046,302 | France | July 8, 1953 |
| 677,617 | Germany | June 29, 1939 |